US011288254B2

(12) United States Patent
Puchin et al.

(10) Patent No.: US 11,288,254 B2
(45) Date of Patent: Mar. 29, 2022

(54) METHOD OF AND SYSTEM FOR PROCESSING REQUEST IN DISTRIBUTED DATABASE

(71) Applicant: YANDEX EUROPE AG, Lucerne (CH)

(72) Inventors: Sergey Aleksandrovich Puchin, Mytishchi (RU); Vitaly Nikolaevich Stoyan, Zhukovsky (RU)

(73) Assignee: YANDEX EUROPE AG, Lucerne (CH)

( * ) Notice: Subject to any disclaimer, the term of this patent is extended or adjusted under 35 U.S.C. 154(b) by 449 days.

(21) Appl. No.: 16/433,226

(22) Filed: Jun. 6, 2019

(65) Prior Publication Data

US 2020/0117651 A1 Apr. 16, 2020

(30) Foreign Application Priority Data

Oct. 15, 2018 (RU) .......................... RU2018136221

(51) Int. Cl.
*G06F 16/23* (2019.01)
*G06F 16/27* (2019.01)
(Continued)

(52) U.S. Cl.
CPC .......... *G06F 16/2343* (2019.01); *G06F 9/466* (2013.01); *G06F 16/245* (2019.01); *G06F 16/27* (2019.01)

(58) Field of Classification Search
CPC .... G06F 16/2343; G06F 16/27; G06F 16/245; G06F 9/466
(Continued)

(56) References Cited

U.S. PATENT DOCUMENTS 5,247,677 A 9/1993 Welland et al.
5,278,984 A 1/1994 Batchelor
(Continued)

FOREIGN PATENT DOCUMENTS

CN 105653365 A 6/2016
CN 103514037 B 6/2018
(Continued)

OTHER PUBLICATIONS

Ex Parte Quale Action dated Apr. 23, 2020 received in respect of a related U.S. Appl. No. 16/383,976.
(Continued)

*Primary Examiner* — Robert W Beausoliel, Jr.
*Assistant Examiner* — Arthur Ganger
(74) *Attorney, Agent, or Firm* — BCF LLP

(57) ABSTRACT

A method for processing a request, where the request is of a declaratory-type and is destined from a request source to a distributed database that has a plurality of transaction destination locations (TDLs). The distributed database is part of distributed computer system, and the distributed computer system has a supervisory device. The method is executable by the supervisory device and includes: receiving the request, processing the request to generate a first transaction of a read-type and identifying at least one condition-satisfying TDL, acquiring a lock value for the condition-satisfying TDL, executing the first transaction, processing the request to generate a last transaction of a modification-type for modifying information associated with the at least one TDL, before executing the last transaction, checking a status of the lock, and only executing the last transaction based on a positive outcome. A distributed software system for doing the same is also provided.

40 Claims, 5 Drawing Sheets

(51) Int. Cl.
*G06F 16/245* (2019.01)
*G06F 9/46* (2006.01)
(58) Field of Classification Search
USPC ........................................................ 707/704
See application file for complete search history.

(56) References Cited

U.S. PATENT DOCUMENTS

| | | | |
|---|---|---|---|
| 5,577,202 A | 11/1996 | Padgett | |
| 5,640,563 A | 6/1997 | Carmon | |
| 5,845,316 A | 12/1998 | Hillyer et al. | |
| 6,023,720 A | 2/2000 | Aref et al. | |
| 6,256,755 B1 | 7/2001 | Hook et al. | |
| 6,553,472 B2 | 4/2003 | Yang et al. | |
| 6,757,897 B1 | 6/2004 | Shi et al. | |
| 6,791,992 B1 | 9/2004 | Yun et al. | |
| 6,851,115 B1 | 2/2005 | Cheyer et al. | |
| 6,859,931 B1 | 2/2005 | Cheyer et al. | |
| 7,073,021 B2 | 7/2006 | Iren et al. | |
| 7,177,866 B2 | 2/2007 | Holenstein et al. | |
| 7,474,989 B1 | 1/2009 | Wilcoxon | |
| 7,562,362 B1 | 7/2009 | Paquette et al. | |
| 7,971,093 B1 | 6/2011 | Goel et al. | |
| 8,037,024 B1 | 10/2011 | Bozkaya et al. | |
| 8,117,621 B2 | 2/2012 | Singh et al. | |
| 8,145,838 B1 | 3/2012 | Miller et al. | |
| 8,254,172 B1 | 8/2012 | Kan et al. | |
| 8,595,302 B2 | 11/2013 | Krishnamurthi et al. | |
| 8,799,913 B2 | 8/2014 | Yoo et al. | |
| 8,826,301 B2 | 9/2014 | Kim et al. | |
| 8,838,539 B1 | 9/2014 | Ashcraft et al. | |
| 8,850,018 B2 | 9/2014 | Massa et al. | |
| 8,850,446 B2 | 9/2014 | Avni et al. | |
| 8,862,561 B1 * | 10/2014 | Nesbit ................ | G06F 11/1076 707/698 |
| 8,930,954 B2 | 1/2015 | Hildrum et al. | |
| 8,966,490 B2 | 2/2015 | Avni et al. | |
| 9,037,826 B1 | 5/2015 | Brooker et al. | |
| 9,047,331 B2 | 6/2015 | Rao et al. | |
| 9,093,160 B1 | 7/2015 | Ellis et al. | |
| 9,203,900 B2 | 12/2015 | Rao et al. | |
| 9,251,195 B2 | 2/2016 | Yamada | |
| 9,304,694 B2 | 4/2016 | Colgrove et al. | |
| 9,348,592 B2 | 5/2016 | Jha | |
| 9,354,813 B1 | 5/2016 | Dolan et al. | |
| 9,400,682 B2 | 7/2016 | Persikov et al. | |
| 9,477,521 B2 | 10/2016 | Truong et al. | |
| 9,489,443 B1 | 11/2016 | Muniswamy-Reddy et al. | |
| 9,547,528 B1 | 1/2017 | McClure et al. | |
| 9,569,339 B1 | 2/2017 | Villalobos et al. | |
| 9,639,396 B2 | 5/2017 | Pho et al. | |
| 9,699,017 B1 | 7/2017 | Gupta et al. | |
| 9,811,391 B1 | 11/2017 | Barrett | |
| 9,921,557 B2 | 3/2018 | Slupik et al. | |
| 10,552,215 B1 | 2/2020 | Xu | |
| 10,572,323 B1 | 2/2020 | Zhai et al. | |
| 2002/0099756 A1 | 7/2002 | Catthoor et al. | |
| 2003/0115410 A1 | 6/2003 | Shriver | |
| 2004/0213387 A1 | 10/2004 | Chandrasekaran | |
| 2005/0047425 A1 | 3/2005 | Liu et al. | |
| 2007/0002750 A1 | 1/2007 | Sang | |
| 2007/0226332 A1 | 9/2007 | Becker-Szendy et al. | |
| 2007/0268516 A1 | 11/2007 | Bugwadia et al. | |
| 2007/0282660 A1 | 12/2007 | Forth et al. | |
| 2008/0049633 A1 | 2/2008 | Edwards et al. | |
| 2008/0168452 A1 | 7/2008 | Molaro et al. | |
| 2008/0320482 A1 | 12/2008 | Dawson et al. | |
| 2009/0013154 A1 | 1/2009 | Du et al. | |
| 2009/0292744 A1 | 11/2009 | Matsumura | |
| 2009/0300449 A1 | 12/2009 | Qian et al. | |
| 2010/0011182 A1 | 1/2010 | Le Moal et al. | |
| 2010/0035581 A1 | 2/2010 | Park et al. | |
| 2010/0185847 A1 | 7/2010 | Shasha et al. | |
| 2011/0145830 A1 | 6/2011 | Yamaguchi | |
| 2011/0153566 A1 | 6/2011 | Larson et al. | |
| 2011/0196834 A1 | 8/2011 | Kesselman et al. | |
| 2011/0219100 A1 | 9/2011 | Dhuse et al. | |
| 2011/0261698 A1 | 10/2011 | Kamerkar et al. | |
| 2011/0314070 A1 | 12/2011 | Brown et al. | |
| 2012/0046807 A1 | 2/2012 | Ruther et al. | |
| 2012/0047317 A1 | 2/2012 | Yoon et al. | |
| 2012/0066449 A1 | 3/2012 | Colgrove et al. | |
| 2012/0124273 A1 | 5/2012 | Goss et al. | |
| 2012/0204265 A1 | 8/2012 | Judge | |
| 2012/0278801 A1 | 11/2012 | Nelson et al. | |
| 2013/0042156 A1 | 2/2013 | Srinivasan et al. | |
| 2013/0132057 A1 | 5/2013 | Deng et al. | |
| 2013/0191836 A1 | 7/2013 | Meyer | |
| 2013/0227186 A1 | 8/2013 | Laughton | |
| 2013/0326161 A1 | 12/2013 | Cohen et al. | |
| 2014/0019987 A1 | 1/2014 | Verma et al. | |
| 2014/0074623 A1 | 3/2014 | Mohammadi et al. | |
| 2014/0157276 A1 | 6/2014 | Smithson et al. | |
| 2014/0208327 A1 | 7/2014 | Cadambi et al. | |
| 2014/0226565 A1 | 8/2014 | Velev et al. | |
| 2014/0250438 A1 | 9/2014 | Shin et al. | |
| 2014/0282572 A1 | 9/2014 | Kang | |
| 2014/0304601 A1 | 10/2014 | Rossano et al. | |
| 2015/0127625 A1 | 5/2015 | Bulkowski et al. | |
| 2015/0128149 A1 | 5/2015 | Meijer et al. | |
| 2015/0237157 A1 | 8/2015 | Wang et al. | |
| 2015/0347185 A1 | 12/2015 | Holt et al. | |
| 2015/0347211 A1 | 12/2015 | Dang et al. | |
| 2015/0347554 A1 | 12/2015 | Vasantham et al. | |
| 2016/0149964 A1 | 5/2016 | Pastro | |
| 2016/0188376 A1 | 6/2016 | Rosas et al. | |
| 2016/0266934 A1 | 9/2016 | Rimoni | |
| 2016/0291885 A1 | 10/2016 | Pendharkar et al. | |
| 2017/0017676 A1 | 1/2017 | Levy et al. | |
| 2017/0031713 A1 | 2/2017 | Campbell et al. | |
| 2017/0048021 A1 | 2/2017 | Yanovsky et al. | |
| 2017/0109203 A1 | 4/2017 | Liu et al. | |
| 2017/0147488 A1 | 5/2017 | Vaquero | |
| 2017/0177697 A1 | 6/2017 | Lee et al. | |
| 2017/0308403 A1 | 10/2017 | Turull et al. | |
| 2017/0322996 A1 * | 11/2017 | Horowitz ............... | G06F 16/278 |
| 2017/0374516 A1 | 12/2017 | Huo et al. | |
| 2018/0006999 A1 | 1/2018 | Doukhvalov et al. | |
| 2018/0041477 A1 | 2/2018 | Shaposhnik | |
| 2018/0052710 A1 | 2/2018 | Choi et al. | |
| 2018/0101448 A1 | 4/2018 | Ventura et al. | |
| 2018/0114290 A1 | 4/2018 | Paltashev et al. | |
| 2018/0157543 A1 | 6/2018 | Bellomo et al. | |
| 2018/0260125 A1 | 9/2018 | Botes et al. | |
| 2018/0293123 A1 | 10/2018 | Kondapalli et al. | |
| 2018/0300385 A1 | 10/2018 | Merriman et al. | |
| 2019/0163546 A1 | 5/2019 | Ungar et al. | |
| 2019/0171763 A1 | 6/2019 | Cai et al. | |
| 2019/0199515 A1 | 6/2019 | Carver et al. | |
| 2019/0392061 A1 | 12/2019 | Terry et al. | |
| 2020/0074416 A1 | 3/2020 | Mathew | |
| 2020/0252761 A1 | 8/2020 | Podluzhny | |

FOREIGN PATENT DOCUMENTS

| | | |
|---|---|---|
| EA | 01078 B1 | 11/2018 |
| EP | 2110990 A1 | 10/2009 |
| EP | 1508850 A3 | 3/2015 |
| GB | 2351375 A | 12/2000 |
| RU | 2273105 C2 | 3/2006 |
| RU | 2376635 C2 | 12/2009 |
| RU | 2388039 C2 | 4/2010 |
| RU | 2494453 C2 | 9/2013 |
| RU | 2533638 C2 | 11/2014 |
| RU | 2543558 C2 | 3/2015 |
| RU | 2547705 C2 | 4/2015 |
| RU | 2581551 C2 | 4/2016 |
| RU | 2628146 C2 | 8/2017 |
| RU | 2649788 C1 | 4/2018 |
| RU | 2665212 C2 | 8/2018 |
| RU | 2670573 C2 | 10/2018 |

(56) References Cited

FOREIGN PATENT DOCUMENTS

WO 2012065018 A2 5/2012
WO 2016197716 A1 12/2016

OTHER PUBLICATIONS

Office Action dated Mar. 10, 2021 received in respect of a related U.S. Appl. No. 16/367,537.
Ex Parte Quale Action dated Oct. 22, 2020 received in respect of a related U.S. Appl. No. 16/560,409.
Office Action dated Oct. 23, 2020 received in respect of a related U.S. Appl. No. 16/504,040.
Notice of Allowance dated Oct. 15, 2020 received in respect of a related U.S. Appl. No. 16/433,186.
Ruemmier "An Introduction to Disk Drive Modeling", Hewlett Packard Laboratories, IEEE, Mar. 1994, pp. 17-29 (Year 1994).
IEEE 100, The Authoritative Dictionary of IEEE Standards Terms, Seventh Edition, IEEE Press, 2000, pp. 245, 1184 (Year: 2000).
Office Action dated Nov. 12, 2020 received in respect of a related U.S. Appl. No. 16/367,537.
Office Action dated Nov. 20, 2020 received in respect of a related U.S. Appl. No. 16/776,011.
Grefen et al. "Two-Layer Transaction Management for Workflow Management Applications", Database And Expert Systems Applications, pp. 430-439, publication date: Sep. 1997430-439.
"Deadline scheduler", retrieved on Wikipedia on Jan. 21, 2019.
"Shortest seek first", retrieved on Wikipedia on Jan. 21, 2019.
"Elevator algorithm", retrieved on Wikipedia on Jan. 21, 2019.
Abeni et al., "Constant Bandwidth Server Revisited", EWiL'14, Nov. 2014, Lisbon, Portugal.
Virtuozzo Storage 2.3, Installation Guide, Dec. 14, 2017, retrieved from https://docs.virtuozzo.com/virtuozzo_storage_2_installation_guide/planning-virtuozzo-storage-infrastructure/understanding-data-redundancy.html.
Russian Search Report dated Oct. 30, 2019 issued in respect of the Russian Patent Application No. RU2018136221.
Notice of Allowance dated May 18, 2021 received in respect of a related U.S. Appl. No. 16/401,688.
Office Action dated Dec. 4, 2020 received in respect of a related U.S. Appl. No. 16/401,688.
Office Action dated Jan. 1, 2021 received in respect of a related U.S. Appl. No. 16/384,301.
Russian Search Report dated Feb. 25, 2020 issued in respect of the Russian Patent Application No. RU2018147497.
Russian Search Report dated Feb. 25, 2010 issued in respect of the Russian Patent Application No. RU2018135460.
Notice of Allowance dated Mar. 23, 2021 received in respect of a related U.S. Appl. No. 16/574,277.
Russian Search Report dated Nov. 8, 2019 issued in respect of the Russian Patent Application No. RU2018132711.
Russian Search Report dated Nov. 26, 2019 issued in respect of the Russian Patent Application No. RU2018144176.
Russian Search Report dated Nov. 26, 2019 issued in respect of the Russian Patent Application No. RU2018132714.
Russian Search Report dated Nov. 25, 2019 issued in respect of the Russian Patent Application No. RU2018135452.
Kumar et al., "Optimized Particle Swarm Optimization Based Deadline Constrained Task Scheduling in Hybrid Cloud", ICTACT Journal of Soft Computing, Jan. 2016, Vlume 06, Issue 02, pp. 1117-1122 (Year: 2016).
Shin et al., "Deadline-Guaranteed Scheduling Algorithm with Improved Resource Utilization for Cloud Computing", 12th Annual IEEE Consumer Communications and Networking Conference (CCNC), 2015, pp. 814-819 (Year 2015).
Chopra et al., "Deadline and Cost based Workflow Scheduling in Hybrid Cloud", 2013, IEEE, pp. 840-846 (Year: 2013).
Yuan et al., "Deadline divison-based heuristic for cost optimization in workflow scheduling". Information Sciences 179 (2009) 2562-2575, Elsevier, pp. 2562-2575 (Year: 2009).
Srinivasan et al., "Deadline-based scheduling of periodic task systems on multiprocessors", Information Processing Letters 84 (2002), 93-98, Elsevier, pp. 93-98 (Year: 2002).
Russian Search Report dated Jan. 18, 2021 issued in respect of the Russian Patent Application No. RU2019103253.

\* cited by examiner

METHOD OF AND SYSTEM FOR PROCESSING REQUEST IN DISTRIBUTED DATABASE

CROSS-REFERENCE

The present application claims priority from Russian Patent Application No. 2018136221, entitled "Method of and System for Processing Request in Distributed Database," filed Oct. 15, 2018, the entirety of which is incorporated herein by reference.

FIELD

The present technology relates to request processing in a database in general, and more specifically to a method and a system for processing a declaratory-type request destined to a distributed database in a distributed computer system.

BACKGROUND

Storage requirements for storing digital data are continuously increasing due to the large volume of digital data that is being created everyday. For example, various types of user data, organization data and/or application data may need to be stored. This increases the demand for data storage capacity. Cloud storage systems may provide data storage capacity to users and/or organizations in order to cope with these increasing storage capacity requirements.

Generally speaking, cloud storage is a model of computer storage in which the digital data is stored in logical pools. The physical storage, where the digital data is actually stored, spans multiple servers, possibly located in different locations (i.e. different data centers), and is typically managed by a company hosting cloud storage services. Users and/or organizations usually buy or lease storage capacity from cloud storage service providers in order to store their digital data. In return, cloud storage service providers are responsible for keeping the digital data available and accessible while ensuring that the physical storage is protected for avoiding data loss.

The physical storage of a cloud storage service provider, in some cases, hosts a distributed database that is configured to acquire transactions for inputting/outputting digital data. A given transaction can be seen as a unit of work (i.e. a "task") to be performed by the distributed database and that potentially represents a change in the state of the distributed database. For example, a given transaction may be a specific intended run of a computer program that accesses a database and provides data retrieval and/or data update capabilities for operators of the distributed database.

One important feature required by cloud storage systems is synchronicity and avoidance of data loss and data collision, especially when processing a plurality of requests from request sources such as client devices.

United States Patent Application Publication No. 2010/185847 A1 published on Jul. 22, 2010 to New York University and titled "Database outsourcing with access privacy" teaches a new paradigm for outsourcing the transaction processing backend of a multi-client database application to an untrusted service provider. Specifically, the invention enables untrusted service providers to support transaction serialization, backup and recovery for clients, with full data confidentiality and correctness. Moreover, providers learn nothing about transactions (except their size and timing), thus achieving read and write access pattern privacy.

United States Patent Application Publication No. 2011/0153566 A1 published on Jun. 23, 2011 to Microsoft and titled "Optimistic serializable snapshot isolation" teaches a concurrency control technique that ensures isolation among concurrently execution transactions optimistically in a multiversion database by applying two optional tests at the end of a read-write transaction: validating the visibility of the read set of the read-write transaction(s) and phantom detection by re-scanning and confirming no new version have appeared in the view. Depending on desired level of isolation, both, one or none of the test are applied. Each version of a data record in an applicable database can be assigned two timestamps indicating the lifetime the version. The value of a version timestamp, though assigned, may be conditional on a transaction committing.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

The present technology is directed to processing a request of a declarative type in a distributed system including state machines and a distributed database into a plurality of deterministic transactions of read-types and modification-types. More specifically, non-limiting embodiments of the present technology are directed to methods and systems that ensure transaction synchronicity in the distributed system by preventing simultaneous access and/or modification of information in the distributed database. Even more specifically, some non-limiting embodiments of the present technology are directed to methods and systems that ensure transaction synchronicity by using locking of the portions of the distributed database, for example, by using optimistic-type locking or pessimistic-type locking.

Ensuring transaction synchronicity in the distributed system by preventing simultaneous access and/or modification of information in the distributed database may allow, in some instances, saving computational resources, improving security, avoiding data loss and data collisions, as well as ensuring optimal functioning of the distributed system.

In accordance with first broad aspect of the present technology, there is provided a method of processing a request of a declaratory-type. The request is destined from a request source to a distributed database, and the request source is connected to a distributed computer system. The distributed database is part of the distributed computer system, the distributed computer system has query processing system, and the distributed database has a plurality of transaction destination locations (TDLs). The method is executable by the query processing system. The method comprises: receiving, by the query processing system, the request from the request source, where the request includes: (i) a condition for identifying at least one TDL, and (ii) an action to be executed on the at least one TDL. The query processing system processes the request to generate a first transaction, where the first transaction is of a read-type, the first transaction is of a deterministic-type, and the first transaction is configured to: identify at least one condition-satisfying TDL, the at least one condition-satisfying TDL having information identifying the at least one TDL and satisfying the condition. The first transaction is also configured to acquire a lock value for the at least one condition-satisfying TDL, where the lock value is indicative of a current state of the at least one condition-satisfying TDL.

The method executes the first transaction. The query processing system processes the request and the at least one TDL to generate a last transaction, where the last transaction is of a modification-type, the last transaction is of the deterministic-type, and where the last transaction is configured to: access information associated with the at least one TDL based on the request. The method comprises, before executing the last transaction, determining if a current lock value associated with the condition-satisfying TDL matches the lock value for the condition-satisfying TDL, where the current lock value is representative of a then-state of the condition-satisfying TDL. The method comprises executing the last transaction only if the current lock value matches the lock value, where the executing the last transaction comprising modifying the information associated with the at least one TDL.

In some embodiments of the method, the condition-satisfying TDL is one of the at least one TDLs.

In some embodiments of the method, to identify the at least one condition-satisfying TDL, the method further comprises: accessing an inverted index representative of: (i) the information associated with the plurality of TDLs, and (ii) the respective ones of the plurality of TDLs.

In some embodiments of the method, the condition-satisfying TDL is a set of condition-satisfying TDLs.

In some embodiments of the method, the set of condition-satisfying TDLs is a set of immediately sequential condition-satisfying TDLs.

In some embodiments of the method, to acquire the lock value, the method further comprises: acquiring a spectrum lock value for the set of immediately sequential condition-satisfying TDLs, the spectrum lock value indicating: TDLs of the set of the immediately sequential condition-satisfying TDLs, and a current state of each one of the set of the immediately sequential condition-satisfying TDLs.

In some embodiments of the method, in response to the current lock value not matching the lock value, the method further comprises: not executing the last transaction.

In some embodiments of the method, the method further comprises: transmitting, to the request source, a message indicating that the request has not been processed by the database.

In some embodiments of the method, the message further enables the request source to re-issue the request.

In some embodiments of the method, the determining if the current lock value associated with the condition-satisfying TDL matches the lock value for the condition-satisfying TDL renders a comparison result including one of: the then-state of the condition-satisfying TDL has not changed, and the then-state of the condition-satisfying TDL has changed.

In some embodiments of the method, the then-state of the condition-satisfying TDL has changed based on another modification-type transaction having been executed on the condition-satisfying TDL after executing the first transaction.

In some embodiments of the method, the then-state of the condition-satisfying TDL has not changed based on another read-type transaction having been executed on the condition-satisfying TDL after executing the first transaction.

In some embodiments of the method, the request is an SQL-type query destined from the request source to the distributed database.

In some embodiments of the method, the executing the last transaction further comprises generating a message for the request source indicating a successful processing of the request by the distributed database.

In some embodiments of the method, the modification-type is one of: (i) a write-type, the write-type being configured to modify information associated with the at least one TDL based on the request, and (ii) a verification-type.

In some embodiments of the method, the at least one condition-satisfying TDL comprises at least one of: a target condition-satisfying TDL for modifying information, and a target condition-satisfying TDL for modifying information for obtaining additional data for the last transaction.

In some embodiments of the method, the method further comprises, after executing the first transaction: receiving information identifying the at least one TDL and satisfying the condition based on the execution of the first transaction.

In accordance with another broad aspect of the present technology, there is provided a method of processing a request, where the request is of a declaratory-type and destined from a request source to a distributed database. The request source is connected to a distributed computer system, and the distributed database is part of the distributed computer system. The distributed computer system has a query processing system, and the distributed database has a plurality of transaction destination locations (TDLs). The method is executable by the query processing system. The method comprises: receiving the request from the request source, the request identifying: (i) a condition for identifying at least one TDL, and (ii) an action to be executed on the at least one TDLs. The method comprises processing, by the query processing system, the request to generate a first transaction, where the first transaction is of a read-type, the first transaction is of a deterministic-type, and where the first transaction is configured to: identify at least one condition-satisfying TDL, where the at least one condition-satisfying TDL has information identifying the at least one TDL and satisfying the condition. The method comprises acquiring a lock for the condition-satisfying TDL, and executing the first transaction. The method comprises processing the request and the at least one TDLs to generate a last transaction, where the last transaction is of a modification-type, the last transaction is of the deterministic-type, and where the last transaction is configured to: access information associated with the at least one TDL based on the request. The method comprises, before executing the last transaction, checking a status of the lock associated with the at least one TDL, and only executing the last transaction based on a positive outcome of the checking the status.

In some embodiments of the method, the lock is of an optimistic type, the acquiring the lock comprises acquiring a lock value for the at least one condition-satisfying TDL, the lock value being indicative of a current state of the at least one condition-satisfying TDL, and the checking the status of the lock comprises determining if a current lock value associated with the condition-satisfying TDL matches the lock value for the condition-satisfying TDL, the current lock value representative of a then-state of the condition-satisfying TDL.

In some embodiments of the method, the lock is of a pessimistic type, the acquiring the lock comprises applying the lock on the condition-satisfying TDL such that the condition-satisfying TDL is inaccessible to other transactions in the distributed database, and the checking the status of the lock comprises removing the lock of the condition satisfying TDL, the removing the lock being the positive outcome.

In accordance with another broad aspect of the present technology, there is provided a distributed software system for processing a request from a request source connected to the distributed software system. The distributed software system comprises a distributed database having a plurality of a plurality of transaction destination locations (TDLs), and a query processing system. The query processing system is configured to: receive the request from the request source, where the request includes: (i) a condition for identifying at least one TDL, and (ii) an action to be executed on the at least one TDL. The query processing system is configured to process the request to generate a first transaction, where the first transaction is of a read-type, and where the first transaction is configured to: identify at least one condition-satisfying TDL, the at least one condition-satisfying TDL having information identifying the at least one TDL and satisfying the condition. The first transaction is also configured to acquire a lock value for the at least one condition-satisfying TDL, where the lock value is indicative of a current state of the at least one condition-satisfying TDL. The distributed software system is configured to execute the first transaction. The query processing system is configured to process the request and the at least one TDL to generate a last transaction, where the last transaction is of a modification-type, the last transaction is of the deterministic-type and where the last transaction is configured to: access information associated with the at least one TDL based on the request. The distributed software system is configured to, before executing the last transaction, determine if a current lock value associated with the condition-satisfying TDL matches the lock value for the condition-satisfying TDL, where the current lock value is representative of a then-state of the condition-satisfying TDL. The distributed software system is configured to execute the last transaction only if the current lock value matches the lock value, where the executing the last transaction comprises modifying the information associated with the at least one TDL.

In some embodiments of the system, the condition-satisfying TDL is one of the at least one TDLs.

In some embodiments of the system, to identify the at least one condition-satisfying TDL, the query processing system is further configured to: access an inverted index representative of (i) the information associated with the plurality of TDLs, and (ii) the respective ones of the plurality of TDLs.

In some embodiments of the system, the condition-satisfying TDL is a set of condition-satisfying TDLs.

In some embodiments of the system, the set of condition-satisfying TDLs is a set of immediately sequential condition-satisfying TDLs.

In some embodiments of the system, to acquire the lock value, the query processing system is further configured to: acquire a spectrum lock value for the set of immediately sequential condition-satisfying TDLs, the spectrum lock value indicating: TDLs of the set of the immediately sequential condition-satisfying TDLs, and a current state of each one of the set of the immediately sequential condition-satisfying TDLs.

In some embodiments of the system, in response to the current lock value not matching the lock value, the query processing system is further configured to: not execute the last transaction.

In some embodiments of the system, the query processing system is further configured to: transmit, to the request source, a message indicating that the request has not been processed by the database.

In some embodiments of the system, the message further enables the request source to re-issue the request.

In some embodiments of the system, the determining if the current lock value associated with the condition-satisfying TDL matches the lock value for the condition-satisfying TDL renders a comparison result including one of: the then-state of the condition-satisfying TDL has not changed, and the condition-satisfying TDL has been deleted.

In some embodiments of the system, the then-state of the condition-satisfying TDL has changed based on another modification-type transaction having been executed on the condition-satisfying TDL after executing the first transaction.

In some embodiments of the system, the then-state of the condition-satisfying TDL has not changed based on another read-type transaction having been executed on the condition-satisfying TDL after executing the first transaction.

In some embodiments of the system, the request is an SQL-type query destined from the request source to the distributed database.

In some embodiments of the system, after executing the last transaction, the query processing system is further configured to: generate a message for the request source indicating a successful processing of the request by the distributed database.

In some embodiments of the system, the modification-type is one of: (i) a write-type, the write-type being configured to modify information associated with the at least one TDL based on the request, and (ii) a verification-type.

In some embodiments of the system, the at least one condition-satisfying TDL comprises at least one of: a target condition-satisfying TDL for modifying information, and a target condition-satisfying TDL for modifying information for obtaining additional data for the last transaction.

In some embodiments of the system, the query processing system is further configured to, after executing the first transaction: receive information identifying the at least one TDL and satisfying the condition based on the execution of the first transaction.

In accordance with another broad aspect of the present technology, there is provided a distributed software system for processing a request from a request source connected to the distributed software system. The distributed software system comprises a distributed database having a plurality of a plurality of transaction destination locations (TDLs), a query processing system. The query processing system is configured to receive the request from the request source, the request identifying: (i) a condition for identifying at least one TDL, and (ii) an action to be executed on the at least one TDLs. The query processing system is configured to process the request to generate a first transaction, where the first transaction is of a read-type, the first transaction is of a deterministic-type, and where the first transaction is configured to: identify at least one condition-satisfying TDL, the at least one condition-satisfying TDL having information identifying the at least one TDL and satisfying the condition. The first transaction is configured to acquire a lock for the condition-satisfying TDL. The distributed software system is configured to execute the first transaction. The query processing system is configured process the request and the at least one TDLs to generate a last transaction, where the last transaction is of a modification-type, the last transaction is of the deterministic-type, and where the last transaction is configured to: access information associated with the at least one TDL based on the request. The distributed software system is configured to, before executing the last transaction, check a status of the lock associated with the at least one TDL, and only execute the last transaction based on a positive outcome of the checking the status.

In some embodiments of the system, the lock is of an optimistic type, the acquiring the lock comprises acquiring a lock value for the at least one condition-satisfying TDL, where the lock value is indicative of a current state of the at least one condition-satisfying TDL, where the checking the status of the lock comprises determining if a current lock value associated with the condition-satisfying TDL matches the lock value for the condition-satisfying TDL, where the current lock value is representative of a then-state of the condition-satisfying TDL.

In some embodiments of the system, the lock is of a pessimistic type, the acquiring the lock comprises applying the lock on the condition-satisfying TDL such that the condition-satisfying TDL is inaccessible to other transactions in the distributed database, and the checking the status of the lock comprises removing the lock of the condition satisfying TDL, the removing the lock being the positive outcome.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION OF NON-LIMITING EMBODIMENTS

The present detailed description is intended to be only a description of illustrative examples of the present technology. This description is not intended to define the scope nor set forth the bounds of the present technology. In some cases, helpful examples of modifications may be set forth as an aid to understanding the present technology, and not to define the scope or set forth the bounds of the present technology. These modifications are not an exhaustive list and other modifications are likely possible.

Further, where this has not been done (i.e. where no examples of modifications have been set forth), it should not be interpreted that no modifications are possible and/or that what is described is the sole manner of implementing that particular aspect of the present technology. In addition it is to be understood that the present detailed description provides in certain instances simple implementations of the present technology, and that where such is the case they have been presented in this manner as an aid to understanding. Various implementations of the present technology may be of a greater complexity.

Figure 1:
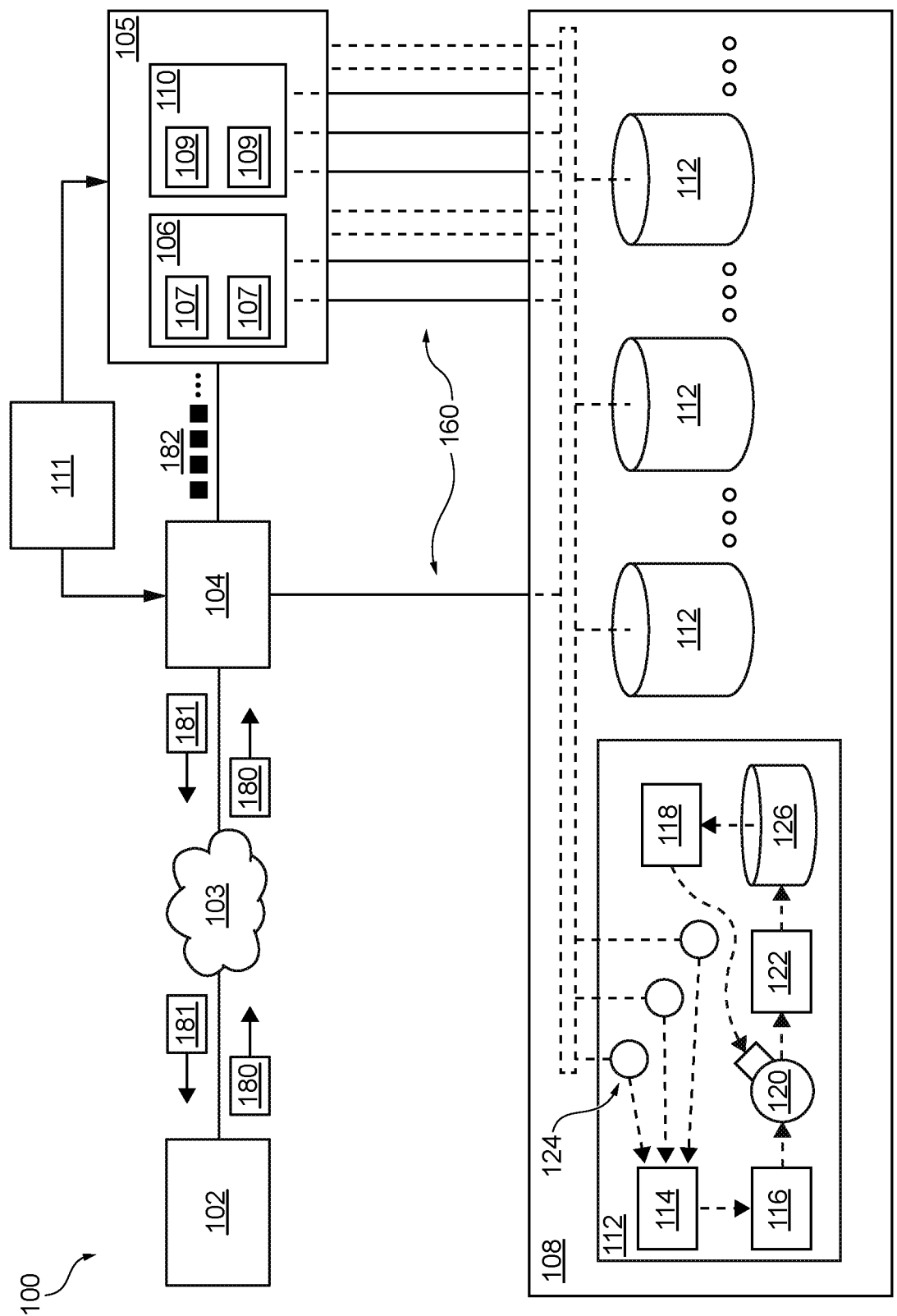
FIG. 1 depicts a schematic diagram of a distributed computer-processing system implemented in accordance with non-limiting embodiments of the present technology.

Referring to FIG. 1, there is depicted a distributed computer-processing system 100 or a "distributed processing system" 100, for short. The distributed processing system 100 is configured for implementing non-limiting embodiments of the present technology. It is to be expressly understood that the distributed processing system 100 as depicted is merely an illustrative implementation of the present technology. Thus, the description thereof that follows is intended to be only a description of illustrative examples of the present technology. This description is not intended to define the scope or set forth the bounds of the present technology.

In some cases, what are believed to be helpful examples of modifications to the distributed processing system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the distributed processing system 100 may provide in certain instances simple implementations of the present technology, and that where such is the case they have been presented in this manner as an aid to understanding. As persons skilled in the art would understand, various implementations of the present technology may be of a greater complexity.

The distributed processing system 100 comprises a request source 102, a communication network 103, a request pre-processing sub-system 104, a transaction processing sub-system 105, a transaction routing sub-system 106, a distributed storage sub-system 108, a database sub-system 110, and an operational sub-system 111.

How the above listed components of the distributed processing system 100 are implemented in accordance to the various non-limiting embodiments of the present technology will now be described.

Request Source

The request source 102 may be an electronic device associated with an end user (e.g., a client device) or, alternatively, any other sub-system of the distributed processing system 100 that is configured to provide user requests for the distributed processing system 100. It should be expressly understood that even though FIG. 1 depicts only a single instance of the request source 102, the distributed processing system 100 may have multiple instances of the request source 102. As illustrated herein, the request source 102 is part of the distributed processing system 100, however, in some embodiments of the present technology, the request source 102 may be external to the distributed processing system 100, and connected via a communication link (not numbered).

In fact, a typical implementation of the distributed processing system 100 can include a large number of request sources 102, such as hundred instances, thousand instances, million instances, and the like.

In some embodiments of the present technology, where the distributed processing system 100 is employed in a business-to-customer (B2C) environment, the request source 102 may be a given client device, such as a smartphone, for example, associated with a given user of the distributed processing system 100. For example, the distributed processing system 100 may potentially provide cloud storage services for the given client device of the given user.

In other embodiments of the present technology, where the distributed processing system 100 is employed in a business-to-business (B2B) environment, the request source 102 may be a given sub-system, such as a remote server, for example, providing user requests to the distributed processing system 100. For example, in some embodiments of the present technology, the distributed processing system 100 may provide fault-tolerant data processing and/or storage services for an operator of the given sub-system.

Broadly speaking, irrespective of whether the distributed processing system 100 is implemented as a B2C or a B2B system (or any other variation of the system for that matter), the request source 102 may be a given client device or another sub-system which can be internal or external to the distributed processing system 100.

As mentioned above, the request source 102 is configured to issue a plurality of requests 180, each of which will be referred herein below as the request 180. The nature of the request 180 will depend on a type of the request source 102. However, one example of the request 180 is a query expressed in Structured Query Language (SQL). Therefore, it is contemplated that in some embodiments of the present technology, the request 180 may be expressed in a declarative programming language, which means that the request 180 may be a declarative-type request.

Generally speaking, declarative programming is a style of building a structure and elements of computer programs that expresses the logic of a computation without describing a control flow thereof. Common declarative programming languages include, but are not limited to, SQL, XQuery and other database query languages. Broadly speaking, a declarative-type request is one that specifies an action in terms of "what" needs to be executed, as opposed to how "how" it needs to be executed.

This means that a given declarative-type request may be associated with a given condition under which a given action should be executed. The given condition may be, for example, a condition on which entity the given action is to be executed or where to obtain values for the given action to be executed.

As non-limiting examples, the given declarative-type request can be formulated such as: "Upsert a value of 5 in a cell associated with a key that is equal to a value of a cell associated with a key A" and "For all keys associated with a cell having a value of 5, replace that value with a value 10". However, it should be understood that examples of declarative languages and examples of declarative-type requests have been provided above for ease of illustration only, and that other declarative languages and other declarative-type requests may be used by the request source 102, without departing from the scope of the present technology.

In some embodiments of the present technology, the request source 102 is also configured to receive a plurality of responses 181, each of which will be referred herein below as the response 181. Generally speaking, in response to the request 180 being processed (or potentially not processed) by the distributed processing system 100, the distributed processing system 100 may generate the response 181 destined to the request source 102 associated with the respective request 180. The nature of the response 181 will depend on inter alia a type of the request source 102, the type of the respective request 180 and whether the distributed processing system 100 processed (or potentially not processed) the respective request 180. In some embodiments of the present technology, the distributed processing system 100 may generate the response 181 only in case of a failure to process the request, only in case of a successful processing of the request, or both.

In one example, during processing of the request 180, the distributed processing system 100 may be configured to request additional data from the request source 102 for continuing or completing processing of the request 180. In such a case, the distributed processing system 100 may be configured to generate the response 181 in a form of a data-request message being indicative of additional data requested by the distributed processing system 100 for continuing or completing the processing of the request 180.

In another example, if the distributed processing system 100 successfully processed the respective request 180, the distributed processing system 100 may be configured to generate the response 181 in a form of a success message being indicative of successful processing of the respective request 180.

In a further example, if the distributed processing system 100 failed to successfully process the respective request 180, the distributed processing system 100 may be configured to generate the response 181 in a form of a failure message being indicative of failed processing of the respective request 180. In such a case, the request source 102 may be configured to perform additional actions such as, but not limited to, re-issuing the request 180, performing diagnostic analyzes for identifying the reason of failed processing of the request 180 by the distributed processing system 100, issuing a new request destined to the distributed processing system 100, and the like.

Communication Network

The request source 102 is communicatively coupled to the communication network 103 for providing the request 180 to the distributed processing system 100 and for receiving the response 181 from the distributed processing system 100. In some non-limiting embodiments of the present technology, the communication network 103 can be implemented as the Internet. In other non-limiting embodiments of the present technology, the communication network 103 can be implemented differently, such as any wide-area communication network, local-area communication network, a private communication network and the like. How a communication link (not separately numbered) between the request source 102 and the communication network 103 is implemented will depend on inter alia how the request source 102 is implemented.

Merely as an example and not as a limitation, in those embodiments of the present technology where the request source 102 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the request source 102 is implemented as a remote server, the communication link can be either wireless (such as Wireless Fidelity, or WiFi® for short, Bluetooth® or the like) or wired (such as an Ethernet based connection).

It should be noted that the communication network 103 is configured to transmit inter alia a request data-packet comprising the request 180 from the request source 102 to the request pre-processing sub-system 104 of the distributed processing system 100. For example, this request data-packet may comprise computer-executable instructions written in a given declarative-type programming language which represent the request 180. The communication network 103 is also configured to transmit inter alia a response data-packet comprising the response 181 from the distributed processing system 100 to the request source 102. For example, this response data-packet may comprise computer-executable instructions representing the response 181.

However, it is contemplated that, in some embodiments of the present technology, where the request source 102 is a given sub-system of the distributed processing system 100, for example, the communication network 103 may be implemented in a different manner from what is described above or, in some cases, may even be omitted, without departing from the scope of the present technology.

Operational Sub-System (Hive)

As mentioned above, the distributed processing system 100 comprises the operational sub-system 111, or simply "the hive", for short. Generally speaking, the hive 111 is a given software-based application (for example, a state machine) that is configured to manage at least some sub-systems of the distributed processing system 100, such as the request pre-processing sub-system 104, and the transaction processing sub-system 105, for example. It can be said that the hive 111 may be embodied as a given State Machine (SM) that is configured to generate, delete and/or balance load of other SMs forming the at least some sub-systems of the distributed processing system 100.

It should be understood that a given SM is a computational model employed by computer systems and which is defined by a list of "states". The given SM may change its current state in response to some external input and may be in exactly one state at any given moment in time. A change from a given state to another state of the given SM is called a "state transition".

It should be noted that, in the context of the present technology, the SMs forming the at least some sub-systems of the distributed processing system 100 are deterministic in nature, that is, each state transition of each such SM is uniquely determined by (i) a current state of a respective SM and (ii) a given external input provided to the respective SM. In other words, for a given current state of the respective SM and for a given external input, there is a unique next state of the respective SM. This deterministic nature of the state transition is true irrespective of which SM of the distributed processing system 100 is undergoing the state transition.

Therefore, as it will be described further below, in some embodiments of the present technology, the distributed processing system 100 may need to receive external inputs of a particular type that satisfy this deterministic property of the SMs of the at least some sub-systems of the distributed processing system 100.

Distributed Storage Sub-System

As mentioned above, the distributed processing system 100 also comprises the distributed storage sub-system 108. Generally speaking, the distributed storage sub-system 108 is configured to inter alia store "system data" indicative of states, state transitions, external inputs and/or outputs of at least some of the SMs of the distributed processing system 100. For example, the system data associated with a given SM of the distributed processing system 100 may be stored in a form of a log, and where the log is indicative of a historical listing of states, state transitions, external inputs and/or outputs of the given SM.

The distributed storage sub-system 108 is also configured to store "client data"—i.e. data associated with the processed external inputs by the distributed processing system 100. For example, in some embodiments of the present technology, client data may be stored as part of the system data in the distributed storage sub-system 108 without departing from the scope of the present technology.

In order to store the system data and/or the client data, the distributed storage sub-system 108 comprises a plurality of storage devices 112, each of which will be referred herein below as the storage device 112. In accordance with the various embodiments of the present technology, some or all of the plurality of storage devices 112 can be located in a single location or distributed amongst different locations. For example, some or all of the plurality of storage devices 112 can be located in a single server rack and/or a single data center and/or distributed over a plurality of server racks in one or more data centers.

In some embodiments of the present technology, the system data and/or the client data stored by a given storage device 112 may be replicated and stored on more than one other storage devices 112. In these embodiments, such replication and storing of the system data and/or the client data may result in a fault-tolerant storage of the system data and/or the client data by the distributed processing system 100. Fault-tolerant storage of the system data and/or the client data may allow preventing data loss in cases where a given storage device 112 of the distributed storage sub-system 108 becomes, temporarily or permanently, unavailable for storage and data retrieval purposes. Also, this fault-tolerant storage of the system data and/or the client data may allow preventing data loss in cases where a given SM of the distributed processing system 100 becomes, temporarily or permanently, unavailable.

It is contemplated that the storage device 112 may be implemented as a computer server. The computer server comprises at least one physical memory device (i.e. a memory drive 126) and hosts one or more software applications configured to execute computer-readable instructions. The memory drive 126 can be executed as solid state drive (SSD), hard disk drive (HDD), or the like. Therefore, it can be said that the at least one physical memory device can be implemented as either a movable disk type device or a immovable (static) disk type device.

For example, as depicted in FIG. 1, a given storage device 112 may be configured to host software applications, such as, but not limited to: (i) a virtual-drive (Vdrive) application 114, a physical-drive (Pdrive) application 115, at least one drive model application 118, at least one operation scheduling application 120, a real-time operation enforcing application 122, and at least one SM proxy 124. Functionalities of the above listed software applications and of the memory drive 126 for storing at least some system data and/or the client data will be described in greater detail further below with reference to FIG. 2.

Request Pre-Processing Sub-System

As previously alluded to, the transaction processing sub-system 105 may be formed by a number of deterministic SMs that require receiving external inputs of a particular type and which satisfy the deterministic property of the deterministic SMs. It should also be recalled that the request source 102 issues the request 180 in a form of a declarative-type request.

As such, the request pre-processing sub-system 104 is configured to receive the request 180, which is the declarative-type request originated from the request source 102, and to pre-process/translate the request 180 into a plurality of deterministic transactions 182 that satisfy the deterministic property of the number of deterministic SMs forming the transaction processing sub-system 105.

Therefore, broadly speaking, the purpose of the request pre-processing sub-system 104 is to ensure that the transaction processing sub-system 105 is able to process the request 180 by pre-processing/translating the request 180 into a plurality of transactions that are processable by the deterministic SMs of the transaction processing sub-system 105.

It should be noted that the request pre-processing sub-system 104 is also configured to generate the response 181 to be transmitted to the request source 102. Indeed, the request pre-processing sub-system 104 is communicatively coupled to the transaction processing sub-system 105, not only to transmit thereto the plurality of deterministic transactions 182, but also to receive therefrom information regarding processing of the plurality of deterministic transactions 182. In some of the non-limiting embodiments of the present technology, the plurality of deterministic transactions 182 can be of one or more of any of a "write" type and a "read" type.

In some embodiments of the present technology, the request pre-processing sub-system 104 is implemented as at least one SM, without departing from the scope of the present technology.

In some embodiments of the present technology, it is contemplated that the distributed computer-processing system 100 of FIG. 1 may support ACID transactions. Broadly speaking, ACID (atomicity, consistency, isolation and durability) is an acronym for a set of transaction properties which are directed to maintain database reliability when transactions are executed. Therefore, in some embodiments of the present technology, it is contemplated that transactions destined to the transaction processing sub-system 105 may be atomical, consistent, isolated and durable, without departing from the scope of the present technology.

Transaction Processing Sub-System

Generally speaking, the transaction processing sub-system 105 is configured to receive and process the plurality of deterministic transactions 182, thereby processing the request 180 of the request source 102. The transaction processing sub-system 105 includes (i) the transaction routing sub-system 106 and (ii) the database sub-system 110, which will now be described in turn.

The database sub-system 110 includes a plurality of transaction destination locations (TDLs) and is partitioned into a plurality of shards 109, each of which will be referred herein below as the shard 109. In one non-limiting example, the database sub-system 110 may host a database having a given database table (or more than one). The given database table may be composed of at least two columns, such as a first column having keys and a second column having records that store data in association with the respective keys. In this non-limiting example, a given TDL may correspond to a given row of the given database table, that is, the given TDL may correspond to a given key and a respective record in the given database table.

As such, in this non-limiting example, each shard 109 of the database sub-system 110 hosts a portion of the given database table. Hence, the given plurality of TDLs, corresponding to the respective rows of the given database table, is split between the plurality of shards 109 such that each shard 109 comprises a respective subset (e.g. range) of the given plurality of TDLs.

In some embodiments of the present technology, it is contemplated that each one of the plurality of shards 109 may be implemented by a respective deterministic SM. This means that, upon receiving a given transaction destined to a TDL of a given shard 109 implemented by a given SM, the given SM may process the transaction and thereby transition to a new state thereof from a current state thereof based on the given transaction, as explained above.

The transaction routing sub-system 106 is configured to route transactions from the plurality of deterministic transaction 182 to respective TDLs and, therefore, to the respective shards 109 of the database sub-system 110. To that end, the transaction routing sub-system 106 may be formed by a plurality of ports that are generally configured to (i) receive the plurality of deterministic transactions 182 from the request pre-processing sub-system 104, (ii) order the plurality of deterministic transactions 182 into subsets of deterministic transactions destined to respective shards 109, and (iii) generate centralized per-shard orders for execution by the respective shards 109 of the deterministic transactions in each one of the centralized per-shard orders of execution.

It should be noted that each one of the plurality of ports forming the transaction routing sub-system 106 may be implemented as a respective SM. In some embodiments, it is contemplated that the plurality of ports may comprise two different types of ports for routing transactions from the plurality of deterministic transactions 182 to the respective shards 109. In other embodiments, at least some functionalities of the plurality of ports may be executed by the SMs corresponding to the plurality of shards 109.

Also, as depicted in FIG. 1, at least some of the SMs of the transaction processing sub-system 105 may be communicatively coupled to the distributed storage sub-system 108 by a respective communication link 160. Broadly speaking, the purpose of a given communication link 160 is to convey system data indicative of inter alia states, state transitions, external inputs and/or outputs of respective SMs to the distributed storage sub-system 108 for storage thereof. How the communication links 160 are established and how the distributed storage sub-system 108 is configured to store the system data will now be described in greater detail with reference to FIG. 2.

Figure 2:
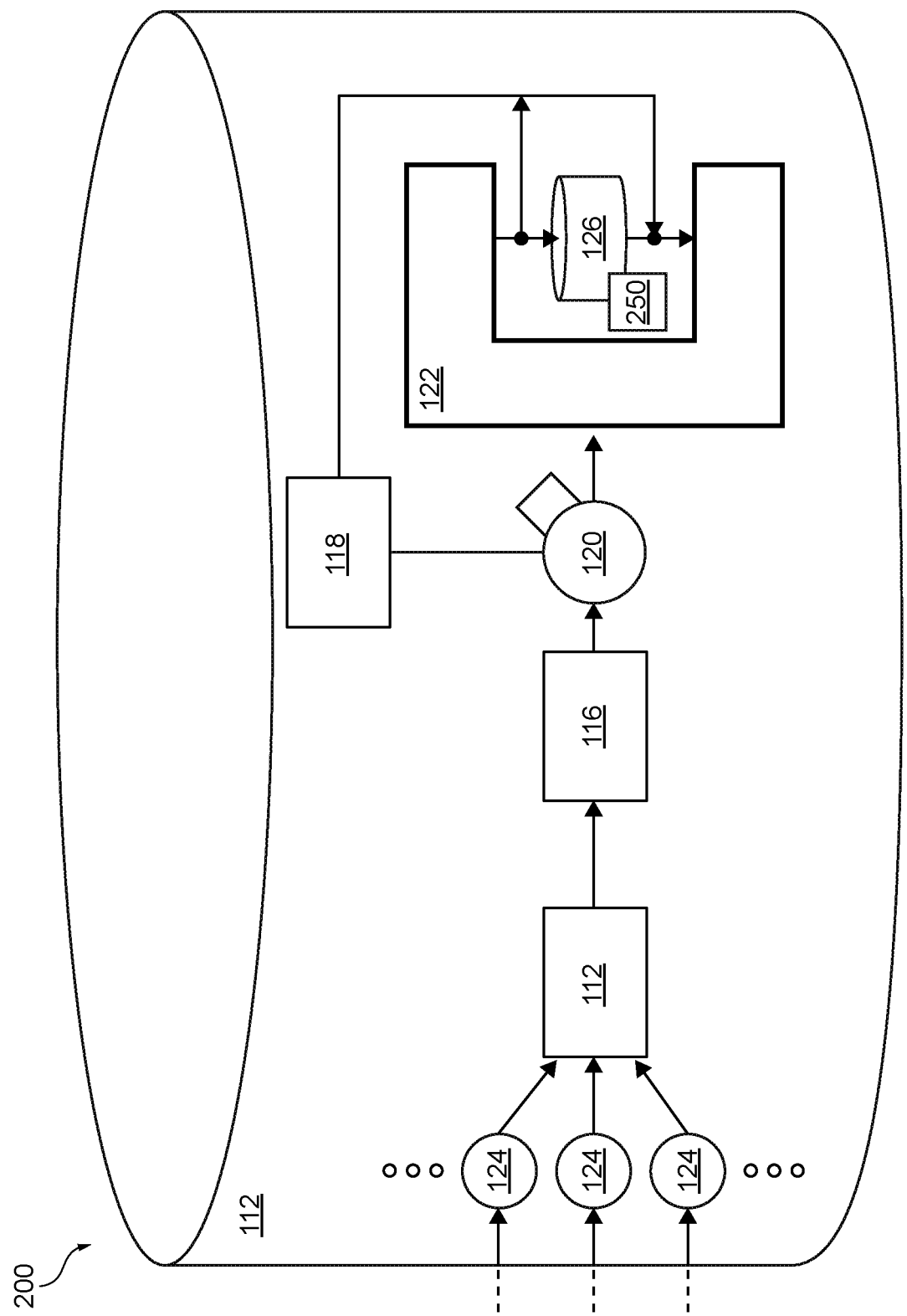
FIG. 2 depicts a storage device part of the computer-processing system of FIG. 1 implemented in accordance with non-limiting embodiments of the present technology.

In FIG. 2, there is depicted the storage device 112 which is part of the distributed storage sub-system 108. As previously mentioned, the storage device 112 comprises the at least one SM proxy 124. The purpose of a given SM proxy is to manage communication between a given SM and the distributed storage sub-system 108. In some embodiments of the present technology, it is contemplated that the at least one SM proxy 124 of the storage device 112 may be an Application Programming Interface (API) managing communication between a given SM and the storage device 112. In other embodiments of the present technology, the at least one SM proxy 124 itself can be implemented as a SM. In other embodiments of the present technology, the at least one SM proxy 124 can be implemented as a software module (not in itself a SM) for executing functions described immediately above.

In some embodiments of the present technology, a given SM proxy 124 may be configured to (i) receive system data indicative of a log update of a given SM via a respective communication link 160, (ii) process the system data, and (iii) transmit the processed system data to a respective Vdrive application 114 for further processing.

The at least one SM proxy 124 may be configured to process the system data, for example, for ensuring consistency and fault-tolerance of the system data. It is contemplated that the at least one SM proxy 124 may be configured to perform erasure-coding of system data, in some embodiments of the present technology. Broadly speaking, erasure-coding is an encoding method in which data is provided with redundancy and is then split into several fragments. Such redundancy provision and fragmentation may facilitate restoration of data if one ore more fragments are lost due to faults in a given system.

It is contemplated that the so-processed system data by the at least one SM proxy 124 is received by the at least one respective Vdrive application 114 of the storage device 112. The purpose of a given Vdrive application 114 is to process the system data received from the at least one SM proxy 124 and, in response, generate corresponding I/O operations that are to be executed by the memory drive 126 for storing the system data on the memory drive 126 of the storage device 112. Once the at least one Vdrive application 114 generates the I/O operations corresponding to the system data received thereby, the at least one Vdrive application 114 then transmits the I/O operations to the Pdrive application 116.

As such, it is contemplated that a given storage device 112 may have more than one SM proxies 124 for processing and transmitting system data to more than one respective Vdrive application 114, which in turn process the system data, generate respective I/O operations, and transmit the respective I/O operations to a single Pdrive application 116 of the storage device 112.

Broadly speaking, the purpose of the Pdrive application 116 is to control operation of the memory drive 126. For example, the Pdrive application 116 may be configured to perform encoding of I/O operations to be executed on the memory drive 126 and various other functionalities that facilitate reliable storage of data on the memory drive 126.

The Pdrive application 116 is commutatively coupled to the operation scheduling application 120 to transmit thereto the I/O operations. The operation scheduling application 120 is configured for scheduling the transmission of the I/O operations to the memory drive 126. It is contemplated that the operation scheduling application 120, or simply "scheduler" for short, may execute various scheduling schemes for determining an order in which the I/O operations are to be transmitted to the memory drive 126 for further execution.

It is contemplated that, in some embodiments of the present technology, the operation scheduling application 120 may be implemented as part of the Pdrive application 116. In other words, execution of various scheduling schemes may be performed by the Pdrive application 116, without departing from the scope of the present technology.

In one case, the operation scheduling application 120 may provide a scheduling scheme of a "fair" type. It should be understood that a given storage device 112 may require to store I/O operations corresponding to system data associated with more than one SMs. Also, each one of the more than one SMs is associated with a pre-determined proportion of drive bandwidth that the memory drive 126 may allocate for executing the I/O operations associated with that respective SM. Therefore, broadly speaking, fair-type scheduling schemes are configured to order the I/O operations to be transmitted to the memory drive 126 such that the drive bandwidth of the memory drive 126 for executing the ordered I/O operations is used in accordance with the pre-determined proportions associated with the more than one SMs.

In another case, the operation scheduling application 120 may provide a scheduling scheme of a "real-time" type. It should be recalled that the distributed processing system 100 may be employed for providing cloud storage services. In many such implementations, it may be desirable to process system data and store it according to real-time requirements or, in other words, within a very short interval of time. As such, in order to support real-time requirements of the distributed processing system 100, the I/O operations may be associated with respective deadlines that are indicative of a moment in time after which the execution of the respective I/O operations is no longer performed within an acceptable amount of time for supporting real-time requirements of the distributed processing system 100. Therefore, broadly speaking, real-time scheduling schemes are configured to order the I/O operations to be transmitted to the memory drive 126 such that the I/O operations are to be executed by the memory drive 126 within respectively associated deadlines.

In a further case, the operation scheduling application 120 may provide a hybrid scheduling scheme. In other words, the operation scheduling application 120 may provide a scheduling scheme that is able to order the I/O operations for transmission of the memory drive 126 for execution such that the pre-determined proportions of drive bandwidth for each respective SM is respected and that respective deadlines of the I/O operations are also respected.

As previously mentioned, the memory drive 126 is a storage medium for executing I/O operations and thereby storing system data transmitted to the storage device 112. For example, the memory drive 126 may be implemented as an HDD or an SSD. The memory drive 126 includes a drive-internal logic 250 for selecting a given I/O operation for current execution amongst all I/O operations transmitted thereto.

It should be noted that I/O operations may potentially be sent one-by-one for execution to the memory drive 126, but this would result in an increased latency between the memory drive 126 and other components of the storage device 112. Therefore, the I/O operations may also be transmitted in batches or groups of I/O operations to the memory drive 126. Once a batch or group of I/O operations is received by the memory drive 126, the drive-internal logic 250 is configured to select amongst the I/O operations available thereto (from the batch) a most efficient I/O operation for execution.

For example, the most efficient I/O operation may be selected based on a variety of criteria such as, for example, a location where a previous I/O operation has been executed on the memory drive 126 and locations of the I/O operations available to the memory drive 126 where they are ought to be executed on the memory drive 126. In other words, the drive-internal logic 250 is configured to select, for current execution, a most efficient one (from the perspective of the memory drive 126) amongst all the I/O operations available to the memory drive 126 at a given moment in time.

For that reason, in some cases, although the operation scheduling application 120 may have ordered I/O operations in a specific order of transmission for respecting the real-time requirements of the distributed processing system 100, the drive-internal logic 250 of the memory drive 126 may instruct the memory drive 126 to organize them in an execution order that is different from the transmission order selected by the operation scheduling application 120. Therefore, it may happen that the execution order may no longer respect the real-time requirements of the distributed processing system 100 (especially as additional I/O operations are received from the operation scheduling application 120, which additional I/O operations may be more "efficient" from the perspective of the memory drive 126 and that may be picked over non-yet-executed I/O operations).

In order to ensure real-time operation of the storage device 112 and to avoid the above-described problem (which is also known as "operation stagnation"), the storage device 112 may include an I/O operations dispatch controller, which will be referred to as the real-time operation enforcing application 122. Broadly speaking, the real-time operation enforcing application 122 allows controlling which I/O operations amongst those that have been already ordered by the operation scheduling application 120 are transmitted at any given time to the memory drive 126 for execution.

It is contemplated that, in some embodiments of the present technology, the real-time operation enforcing application 122 may be implemented as part of the Pdrive application 116. In other words, the above-mentioned functionalities of the real-time operation enforcing application 122 may be performed by the Pdrive application 116, without departing from the scope of the present technology.

The storage device 112 is also configured to host at least one respective drive model application 118 for each memory drive 126 of the storage device 112. Broadly speaking, the drive model application 118 is configured to emulate ideal operation of the memory drive 126 for diagnostic analyses of the memory drive 126. In other embodiments, however, the operation scheduling application 120 may also be configured to employ the drive model application 118 for ordering the I/O operations for transmission to the memory drive 126.

It is contemplated that, in some embodiments of the present technology, the at least one respective drive model application 118 may be implemented as part of the Pdrive application 116. In other words, the above-mentioned functionalities of the at least one respective drive model application 118 may be performed by the Pdrive application 116, without departing from the scope of the present technology.

Distributed Software System

Figure 3:
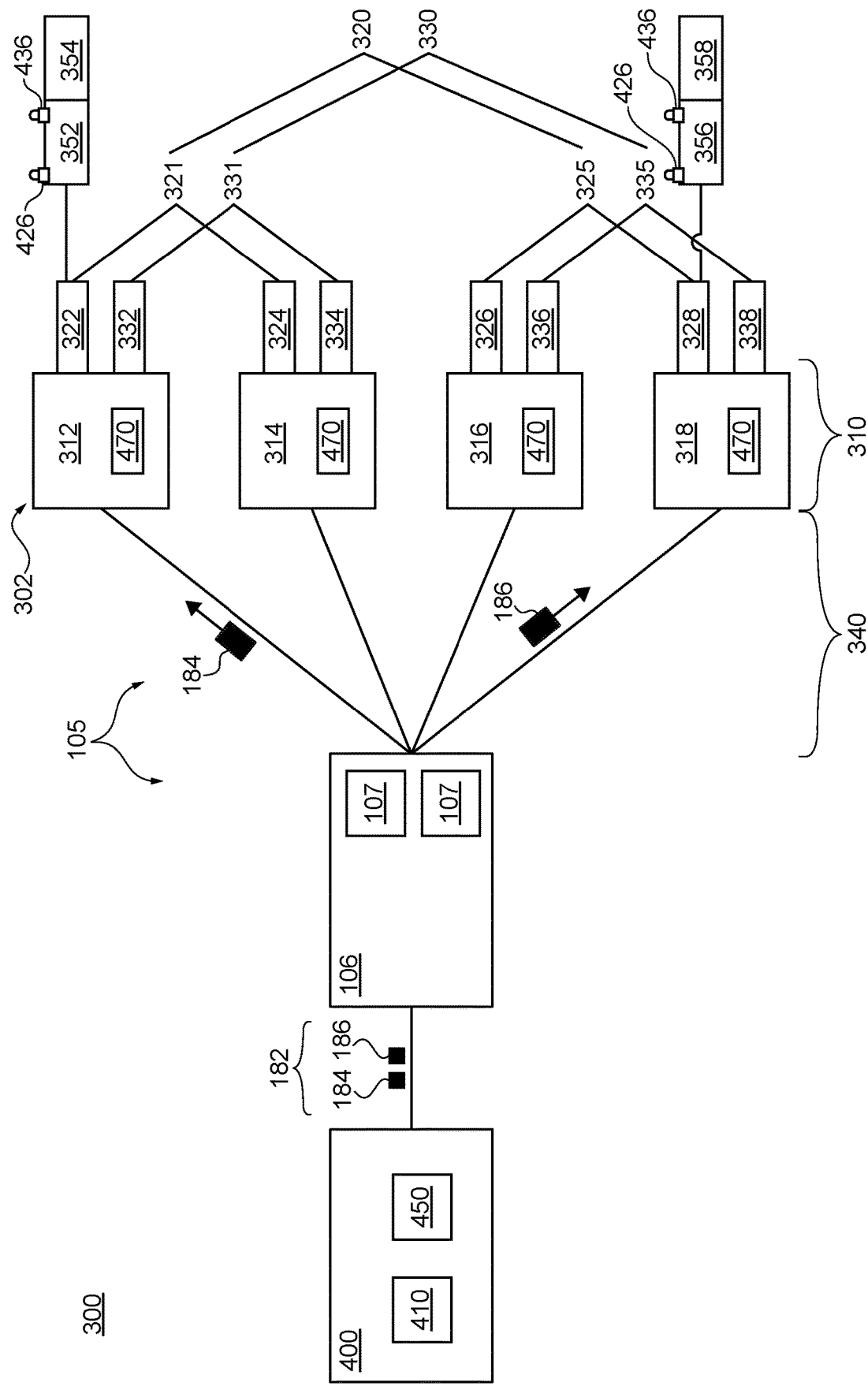
FIG. 3 depicts a schematic representation of a distributed software system of the computer-processing system of FIG. 1, in accordance with non-limiting embodiments of the present technology.

With reference to FIG. 3, there is depicted a schematic representation of a distributed software system 300 for processing the client request 180 into a plurality of transactions 182 (e.g., deterministic transactions) and executing the plurality of transactions 182, the distributed software system 300 being implemented in accordance with non-limiting embodiments of the present technology.

The distributed software system 300 comprises (i) a database sub-system 302, (ii) the transaction routing sub-system 106, and (iii) a declarative to deterministic transaction processing system 400. In one non-limiting example, the database sub-system 302 may be implemented as the database sub-system 110 of FIG. 1, and the declarative to deterministic transaction processing system 400 may be implemented as the request pre-processing sub-system 104 of FIG. 1.

In some embodiments of the present technology, the distributed software system 300 may comprise at least one of: the transaction routing sub-system 106, and the declarative to deterministic transaction processing system 400. In other embodiments of the present technology, the distributed software system 300 and the transaction routing sub-system 106 may also be known as a query processing system.

It should be noted that the database sub-system 302 may be implemented in a distributed manner over a plurality of storage devices (e.g., plurality of storage devices 112 of FIG. 1), and without departing from the scope of the present technology.

Plurality of Shards

On the right side of FIG. 3, there is depicted the database sub-system 302, where the database sub-system 302 comprises a plurality of transaction destination locations (TDLs) 320, and where the database sub-system 302 is partitioned into a plurality of shards 310. For example, the plurality of shards 310 comprises a first shard 312, a second shard 314, a third shard 316, and a fourth shard 318. In one non-limiting example, the plurality of shards 310 may be the plurality of shards 109 of FIG. 1.

In one non-limiting example, the database sub-system 302 may host a database having one or more database tables. A given database table may be composed of at least two columns, such as a first column having keys and a second column having records that store data in association with the respective keys. Further, a record may comprise a plurality of values stored therein. In this non-limiting example, a given TDL of the plurality of TDLs 320 may correspond to a given row of a given database table, that is, the given TDL may correspond to a given key and a respective record in the given database table.

As such, in the non-limiting example illustrated herein, the database sub-system 302 may host a database having a first database table 321 and a second database table 325, where the first database table 321 and the second database table 325 are split among the plurality of shards 310. Hence, the plurality of TDLs 320, corresponding to the respective rows of the first database table 321 and the second database table 325, are split between the plurality of shards 310 such that each shard of the plurality of shards 310 comprises a respective subset (e.g. range) of the plurality of TDLs 320 (i.e. subset rows of the first database table 321 and the second database table 325).

In some embodiments of the present technology, where the distributed software system 300 is configured to receive indirect-key type transactions, the database sub-system 302 may also host an inverted index 330 for the database, where there may be a first inverted index 331 for the first database table 321, and a second inverted index 335 for the second database table 325. Generally speaking, for a given database table composed of at least two columns, such as a first column having keys and a second column having data stored as respective records in association with the respective keys, an inverted index for the given database table may be composed of at least two columns, such as a first column referencing data, and a second column having a list of respective keys associated with the data. The inverted index 330 may also be split among the plurality of shards 310, with an inverted index 330 portion for respective subset of the plurality of TDLs 320 (i.e. subset rows of the first database table 321 and the second database table 325). As a non-limiting example, the inverted index 330 may list, for a given value, all keys having respective records that store the given value, and may thus allow quick retrieval of a list of respective keys associated with a given value stored in the respective records associated with the respective keys by querying the inverted index 330.

It should be noted that, as explained above with reference to the plurality of shards 109, each one of the plurality of shards 310 may be implemented as a respective SM. Although the plurality of shards 310 is depicted in FIG. 3 as including four shards, in other implementations of the present technology, a larger number of shards may be included in the plurality of shards 310, such as ten shards, a hundred shards, a thousand shards, and the like, without departing from the scope of the present technology.

It is also contemplated that the database sub-system 302 may be scalable. For example, it is contemplated that additional shards may be included to the plurality of shards 310 by an operator of the distributed software system 300 for scaling-up the size of the database sub-system 302. As it will become apparent from the description herein below, at least some implementations of the transaction routing sub-system 106 may facilitate this scalability of the database sub-system 302.

The plurality of TDLs 320 is split into respective ranges of the plurality of TDLs 320 and where each respective range is associated with a respective one of the plurality of shards 310. In other words, the plurality of TDLs 320 is split into a plurality of subsets of TDLs (e.g. ranges of TDLs) and where each subset of TDLs is associated with a respective shard from the plurality of shards 310. For example: (i) a first range 322 (e.g., a first subset) of the plurality of TDLs 320 corresponding to a first subset of the first database table 321 is associated with the first shard 312, (ii) a second range 324 (e.g., a second subset) of the plurality of TDLs 320 corresponding to second subset of the first database table 321 is associated with the second shard 314, (iii) a third range 326 (e.g., a third subset) of the plurality of TDLs 320 corresponding to a first subset of the second database table 325 is associated with the third shard 316, and (iv) a fourth range 328 (e.g., a fourth subset) of the plurality of TDLs 320 corresponding to a second subset of the second database table 325 is associated with the fourth shard 318.

As mentioned above, a given one of the plurality of TDLs 320 may correspond to a given key in the database sub-system 302 and records that store data associated with the given key in the database sub-system 302. Thus, it is contemplated that each one of the plurality of shards 310 is configured to store data in the database sub-system 302 that is associated with a given TDL that is included in a respectively associated range of the plurality of TDLs 320.

In one non-limiting example of the present technology, the plurality of TDLs 320 being split into respective ranges of the plurality of TDLs 320 may correspond to a plurality of rows of a given database table (or more than one) being split into ranges of rows of the given database table. A given range of rows may comprise a subset of rows that have keys that are within a given key range.

In some embodiments of the present technology, where the distributed software system 300 is configured to receive indirect-key type queries, the inverted index 330 may be split among the plurality of shards 310 such that each respective portion of the inverted index 330 corresponds to a respective range of the plurality of TDLs 320: (i) a first portion 332 of the inverted index 330 corresponding to the first range 322 (e.g., a first subset) of the plurality of TDLs 320 is associated with the first shard 312, (ii) a second portion 334 of the inverted index 330 corresponding to the second range 324 (e.g., a second subset) of the plurality of TDLs 320 is associated with the second shard 314, (iii) a third portion 336 of the inverted index 330 corresponding to the third range 326 (e.g., a third subset) of the plurality of TDLs 320 is associated with the third shard 316, and (iv) a fourth portion 338 of the inverted index 330 corresponding to the fourth range 328 (e.g., a fourth subset) of the plurality of TDLs 320 is associated with the fourth shard 318.

Generally speaking, a given shard of the plurality of shards 310 is configured to (i) receive a respective centralized per-shard order of execution of transactions destined to TDLs in the respective range of the given shard, (ii) receive the transactions referenced in the respective centralized per-shard order of execution, and (iii) execute the received transactions in accordance with the respective centralized per-shard order of execution. Hence, the purpose of a given shard is to execute transactions destined to TDLs in the respective range of the plurality of TDLs 320 in a given centralized per-shard order of execution. In some alternative non-limiting embodiments of the present technology, (i) receiving the respective centralized per-shard order of execution of transactions destined to TDLs in the respective range of the given shard, (ii) receiving the transactions referenced in the respective centralized per-shard order of execution can be executed in a single step from a single source.

In the context of the present technology, a given centralized per-shard order of execution for a given shard refers to a given order of execution of all transactions that are destined to the given shard amongst the transactions being received at a given moment in time by a respective mediator port of the distributed software system 300.

For example, a given centralized per-shard order of execution destined to the first shard 312 is an order of execution of all the transactions that are destined to the first range 322 amongst the transactions being received at a given moment in time by a first mediator port (not depicted) of the distributed software system 300. In another example, a given centralized per-shard order of execution destined to the fourth shard 318 is an order of execution of all the transactions that are destined to the fourth range 328 amongst the transactions being received at a given moment in time by a fourth mediator port (not depicted) of the distributed software system 300.

Since the database sub-system 302 may be executing more than one transaction at a time (e.g., each one of the plurality of shards 310 may be executing a respective transaction concurrently), the reason for executing transactions in respective centralized per-shard orders of execution by each one the plurality of shards 310 is to allow the database sub-system 302 to execute all the transactions destined to the database sub-system 302 such that the outcome would be the same if compared to a case where all the transactions destined to the database sub-system 302 are executed serially.

In other words, providing a centralized per-shard order of execution for a respective one of the plurality of shards 310 may allow the plurality of shards 310 to be executing more than one transactions concurrently such that the database sub-system 302 is affected by the more than one transactions in a same way that if the more than one transactions have been executed serially.

It should be noted that the plurality of shards 310 of the database sub-system 302 receives the respective centralized per-shard orders of execution from the transaction routing sub-system 106. More specifically, each one of the plurality of shards 310 receives its respective centralized per-shard order of execution from a respective one of a plurality of mediator ports (not depicted) of the transaction routing sub-system 106 via a plurality of communication links 340.

Each of the plurality of shards 310 in the database sub-system 302 may also execute a respective record locker 470 to ensure transaction synchronicity in the database sub-system 302. How the record locker 470 is configured to ensure transaction synchronicity will be explained in more detail herein below.

The declarative to deterministic transaction processing system 400 includes a request validator 410 and a request translator 450.

Request Validator

Generally speaking, the purpose of the request validator 410 is to parse the request 180 to check the validity and syntactical correctness of the request 180 before transmitting the request 180 to the request translator 450. In some embodiments, the request validator 410 may also be configured to correct syntax of the request 180, and may, as a non-limiting example, add missing characters or delete superfluous characters to an otherwise valid request. Additionally or alternatively, the request validator 410 may also be configured to verify if the request 180 is syntactically correct but is not intended no matter for which task the request 180 was written, such as if the request 180 is a contradictory query and always returns an empty set.

Additionally, in some embodiments of the present technology, the request validator 410 may also ensure that the request 180 includes a condition for identifying at least one transaction destination location (TDL) in the database sub-system 110, and an action to be executed on the at least one TDL in the database sub-system 110.

As a result, the request validator 410 may either: (i) validate the request 180, and transmit the request 180 to the request translator 450 for further processing, or (ii) report a problem with the request 180 to the request source 102 by generating the response 181.

It is contemplated that in some embodiments of the present technology, the request validator 410 may be implemented at least partially at the request source 102, to ensure that the request 180 is valid when it is transmitted to the declarative to deterministic transaction processing system 400. In alternative embodiments of the present technology, the request validator 410 may be implemented by the request translator 450. In other embodiments of the present technology, the request validator 410 may be omitted.

After successful validation by the request validator 410, the request translator 450 receives the request 180.

Request Translator

Generally speaking, the purpose of the request translator 450 is to receive the request 180 and to process the request 180 into a plurality of transactions 182, where the plurality of transactions 182 are of a deterministic type, and include at least one read transaction, and at least one modification transaction.

Generally speaking, a deterministic-type transaction is a type of transaction which has two properties: (i) the at least one of the plurality of TDLs 320 it is directed to must be known in advance; and (ii) the transaction always returns the same result any time the transaction is executed with a specific set of input values and given the same state of the at least one of the plurality of TDLs 320 it is directed to. In contrast, a non-deterministic transaction is a type of transaction which potentially returns different results each time the transaction is executed with a specific of input values, even if the state of the at least one of the plurality of TDLs 320 it is directed to does not change.

The request translator 450 is configured to (i) process the request 180 to generate at least one read transaction, the at least one read transaction being of a read-type, the at least one read transaction identifying at least one of the plurality of TDLs 320 in the database sub-system 302 to which the request 180 is directed to and which satisfies a condition, and transmitting the at least one read transaction for execution; and (ii) upon receiving information from execution of the at least one read transaction, process the request 180 to generate a modification transaction, the modification transaction being of a modification-type, the modification transaction allowing to modify data stored in respective records associated with respective keys of the at least one of the plurality of TDLs 320 in the database sub-system 302.

In some embodiments of the present technology, a read transaction may be one of a direct key type and an indirect key type. A direct key type transaction may be a transaction which refers directly to one or more keys associated with respective records, such as "Upsert a value of 5 in a record associated with a key that is equal to a value of a record associated with a key A". An indirect key type transaction may be transaction a which refers indirectly to keys, by referring to data stored in a record, where a plurality of keys may be associated with records having the same data, such as "For all keys associated with a record having a value of 5, replace that value with a value 10". Generally speaking, to process an indirect key type transaction, the distributed software system 300 is configured to use an inverted index (i.e., the inverted index 330).

The request 180 is a declarative-type request, and as a non-limiting example, the request 180 as received by the request translator 450 may be implemented by the following SQL-based code:

UPSERT into table2
SELECT value1 AS key2, 20 AS value2 FROM table1
WHERE key1=10;

In plain words, the request 180 may be expressed as: in the database sub-system 302, replace data in a record of the second database table 325 with "20", the record of the second database table 325 being associated with a second key 356, where the second key 356 is equal to data in a record of a first database table 321 associated with a first key 352 having a value of "10".

The request translator 450 processes the request 180 to generate the first transaction 184 of the plurality of transactions 182.

The purpose of the first transaction 184 is to acquire information necessary for executing "modification" portions of the request 180 (i.e., to change data stored in a record associated with a key of the at least one of the plurality of TDLs 320). Hence, it is said that the first transaction 184 is a read-type transaction, which allows identifying at least one TDL of the plurality of TDLs 320 satisfying a condition (e.g., location of data associated with a given key) necessary for executing the modification portion of the request 180 in the database sub-system 302.

Continuing with the preceding non-limiting example, the request translator 450 processes the request 180, and identifies that at first, information must be acquired from the first database table 321 (i.e., identification of at least one TDL of the plurality of TDLs 320), which stores the first key 352 having the value of "10" (which is a condition necessary to modify information in a TDL (i.e., second database table 325) of the plurality of TDLs 320). The request translator 450 generates the first transaction 184, which may be implemented by the following SQL-based code:

SELECT value1 FROM table1
WHERE key1=10;

In plain words, the first transaction 184 may be expressed as: acquire, from the first database table 321, data stored in the record associated with the first key 352, where the first key 352 has the value "10".

The request translator 450 of the declarative to deterministic transaction processing system 400 transmits the first transaction 184 for execution by the transaction routing sub-system 106. The transaction routing sub-system 106 routes the first transaction 184 to the respective shards of the plurality of shards 310 associated with the first database table 321. In the embodiment illustrated herein, the transaction routing sub-system 106 routes the first transaction 184 to the first shard 312, which is associated with the first range 322 of the plurality of TDLs 320, the first range 322 including the first key 352 having the value of "10" of the first database table 321. The transaction routing sub-system 106 acquires data stored in a first record 354, the first record 354 being associated with the first key 352.

In some embodiments of the present technology, where the first transaction 184 is of an indirect key type, the first transaction 184 is configured to retrieve one or more keys associated with a same value in the respective records associated with the one or more keys via the inverted index 330. As an example, the request translator 450 transmits the first transaction 184 to the transaction routing sub-system 106, which may route the first transaction 184 to the first shard 312 including the first inverted index 331 of the first database table 321.

Upon execution of the first transaction 184 by the transaction processing sub-system 105, the request translator 450 of the declarative to deterministic transaction processing system 400 acquires the data stored in a record associated with the first key 352 in the first range 322 of the plurality of TDLs 320, the first range 322 being associated with the first shard 312. The data stored in the first record 354 may have a value of "35", which is required to generate the last transaction 186.

Upon receiving data from execution the first transaction 184, the request translator 450 processes the request 180 to generate a last transaction 186 of the plurality of transactions 182.

The purpose of the last transaction 186 is to execute the "modification" portions of the request 180 based on information acquired from execution of the first transaction 184. Hence, it is said the last transaction 186 is of a modification-type, and is configured to access information associated with at least one of the plurality of TDLs 320 (which may or may not be different from the at least one of the plurality of TDLs from which information was acquired by the first transaction 184). The modification-type of the last transaction 186 can be of a write-type, the write-type being configured to access and modify information associated with at least one of the plurality of TDLs 320, where new information is written instead of the current information associated with the at least one of the plurality of TDLs 320, such as replacing a current value with another value, or erasing the current value. In some embodiments of the present technology, the modification-type of the last transaction 186 can be a verification-type, the verification-type being a "NULL" transaction, the verification-type last transaction 186 being configured to access information associated with at least one of the plurality of TDLs 320, where the purpose of the verification-type transaction is to perform optimistic-type locking or pessimistic-type locking, which will be explained in more detail herein below.

In some embodiments of the present technology, the last transaction 186 follows immediately after the first transaction 184. In other words, the last transaction 186 can be a second transaction that follows immediately after the first transaction 184. In other embodiments of the present technology, it is contemplated that the plurality of transactions 182 may have additional transaction between the first transaction 184 and the last transaction 186.

Continuing with the preceding non-limiting example, the request translator 450 generates the last transaction 186 directed to the second database table 325 based on the data acquired from the first transaction 184, which was directed to the first database table 321. The last transaction 186 may be implemented by the following SQL-based code:

UPSERT into table2
SELECT 35 AS key2, 20 AS value2

In plain words, the last transaction 186 may be expressed as: in the second database table 325 in the database sub-system 302, replace data stored in a record with "20", the record being associated with the second key 356, where the second key 356 has a value of "35".

The request translator 450 of the declarative to deterministic transaction processing system 400 transmits the last transaction 186 for execution by the transaction routing sub-system 106. The transaction routing sub-system 106 of the transaction processing sub-system 105 routes the last transaction 186 to the respective shards associated with the second database table 325. In the embodiment illustrated herein, the transaction routing sub-system 106 routes the last transaction 186 to the fourth shard 318, which is associated with the fourth range 328 of the plurality of TDLs 320, the fourth range 328 having the second key 356 having the value of "35". The transaction routing sub-system 106 accesses the second record 358 associated with the second key 356, and updates a value stored in the second record 358 with "20".

In some embodiments of the present technology, where the first transaction 184 is of an indirect key type, the last transaction 186 may be configured to update the second database table 325, and the second inverted index 335 of the second database table 325 such that the changes are reflected in both the second database table 325, and the second inverted index 335.

The last transaction 186 may be executed (also known as "committed") only if certain conditions are satisfied, which may be verified by respective record lockers 470 in the plurality of shards 310. Upon execution of the last transaction 186, the transaction processing sub-system 105 generates the response 181 to transmit to the request source 102, the response 181 being indicative of success or failure of execution of the request 180.

The database sub-system 302 includes respective record lockers 470 to verify conditions for executing the plurality of transactions 182. How the record locker 470 of the database sub-system 302 is configured will now be explained in more detail.

Record Locker

Generally speaking, the purpose of the record locker 470 is to ensure transaction synchronicity in the distributed processing system 100 by preventing simultaneous access and/or modification of information in the database sub-system 302 when executing the plurality of transactions 182. To achieve that purpose, the record locker 470 is configured to execute one of: optimistic type locking or pessimistic type locking.

The record locker 470 is executed by each of the plurality of shards 310 of the database sub-system 302. In alternative embodiments of the present technology, a single record locker 470 may be executed by the database sub-system 302. In some embodiments of the present technology, the record locker 470 may be executed by one of the request pre-processing sub-system 104 and the transaction processing sub-system 105.

Pessimistic type locking consists in "locking" a given one of the plurality of TDLs 320 in the database sub-system 302 from the time it is accessed until the end of the transaction, such that it is inaccessible for modification to other transactions during that time. Thus, pessimistic type locking prevents data stored in the given one of the plurality of TDLs 320 to be modified by another transaction in the database sub-system 302. In some embodiments of the present technology, where the first transaction 184 is of an indirect key type, the record locker 470 is configured to lock given entries in the inverted index 330 associated with the given one of the plurality of TDLs 320.

To execute pessimistic type locking, the record locker 470 is configured, during execution of the first transaction 184, to lock the given one of the plurality of TDLs 320. Continuing with the preceding example, the record locker 470 locks the first range 322 of the plurality of TDLs 320 associated with the first shard 312 until execution of the last transaction 186 is completed. The record locker 470 then unlocks the first range 322 of the plurality of TDLs 320.

Optimistic type locking consists in acquiring a lock value which is indicative of a state of the information in the given one of the plurality of TDLs 320 in the database sub-system 302 when it is first accessed, and acquiring another lock value which is indicative of a state of the information in the given one of the plurality of TDLs 320 before executing modification of information in the given one of the plurality of TDLs 320. Optimistic type locking does not prevent other transactions from modifying information associated with the given one of the plurality of TDLs 320 before finishing a transaction, but provides an indication in case the information was indeed modified. If the states of two lock values differ, the transaction is not completed and an error message may be returned to the request source 102 in the response 181.

To execute optimistic type locking, the record locker 470 is configured to: (v) acquire a first lock value 426, the first lock value 426 being indicative of a state of the given one of the plurality of TDLs 320 at a first point in time; (vi) acquire a second lock value 436 for the given one of the plurality of TDLs 320, the second lock value 436 being indicative of a state of the given one of the plurality of TDLs 320 at a second point in time respectively; and (vii) determine if the first lock value 426 and the second lock value 436 match.

In some embodiments of the present technology, the first lock value 426 and the second lock value 436 may be generated by applying a hashing function to data stored in records associated with given keys in the given one of the plurality of TDLs 320, and the hashes of the data stored in the records associated with given keys in a given one of the plurality of TDLs 320 may then be compared.

In some embodiments of the present technology, where the first transaction 184 is of an indirect key type, the record locker 470 may also acquire the first lock value 426 and the second lock value 436 for the inverted index 330.

Figure 4:
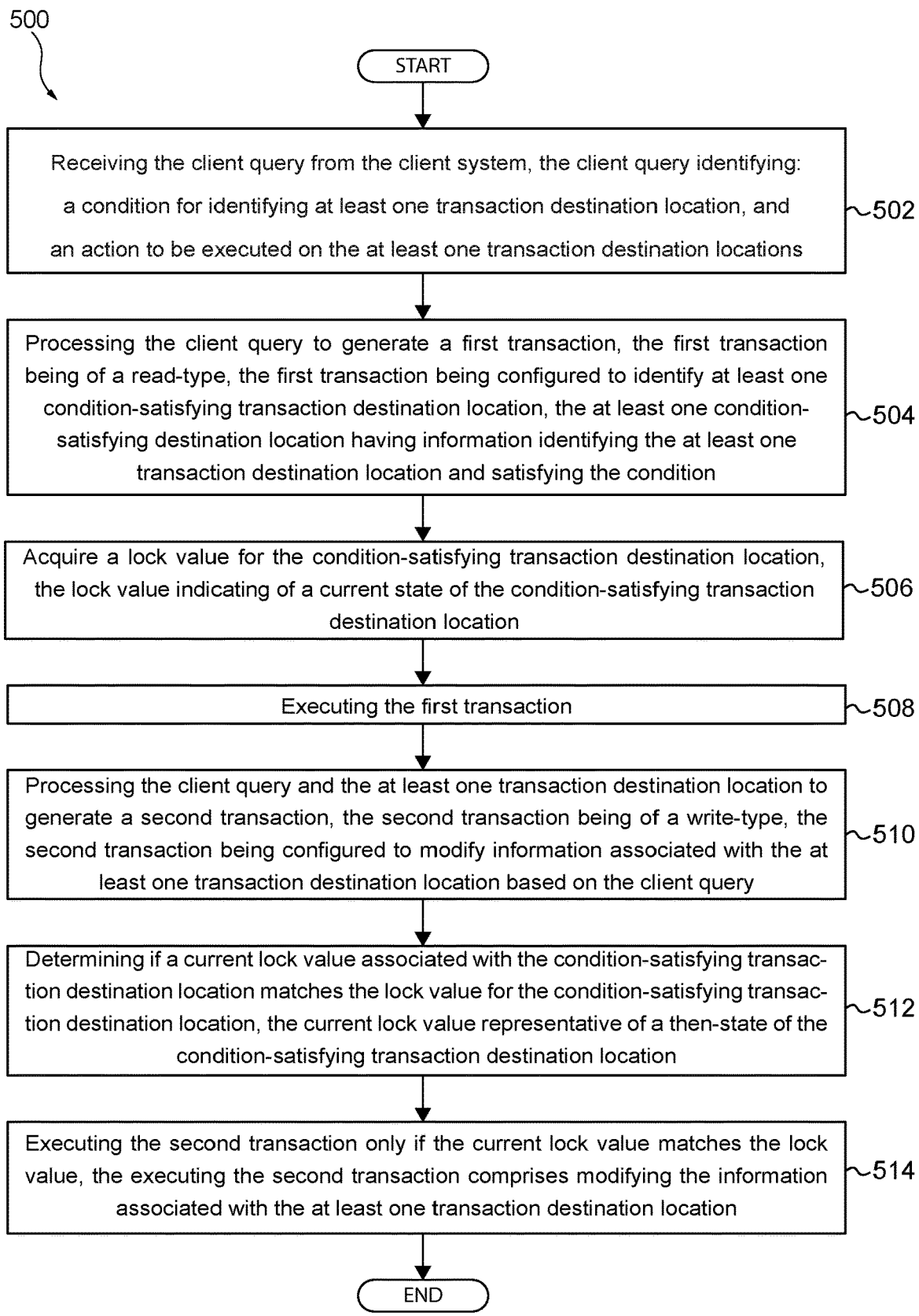
FIG. 4 depicts a flowchart of a method of processing a request in a distributed database using optimistic type locking, the method executable within the computer-processing system of FIG. 1 in accordance with non-limiting embodiments of the present technology.

Now turning to FIG. 4, there is depicted a flowchart of a method 500 of processing a request in a distributed database using optimistic type locking according to non-limiting embodiments of the present technology.

The method 500 is executed by the distributed software system 300 within distributed processing system 100. The method 500 begins at step 502.

STEP 502: receiving the request from the request source, the request identifying:
 (i) a condition for identifying at least one transaction destination location, and
 (ii) an action to be executed on the at least one transaction destination locations At step 502, the declarative to deterministic transaction processing system 400 receives a request in the form of a request 180 from the request source 102, where the request 180 identifies a condition for identifying at least one of the plurality of TDLs 320 and an action to be executed on the at least one of the plurality of TDLs 320. In some embodiments of the present technology, the request validator 410 may parse the request 180 to check the validity and syntactical correctness of the request 180. The request 180 may be an SQL-type query destined from the request source 102 to the database sub-system 302.

The method 500 then advances to step 504.

STEP 504: processing the request to generate a first transaction, the first transaction being of a read-type, the first transaction being of a deterministic-type, the first transaction being configured to identify at least one condition-satisfying transaction destination location, the at least one condition-satisfying transaction destination location having information identifying the at least one transaction destination location and satisfying the condition At step 504, the declarative to deterministic transaction processing system 400 processes the request 180 to generate a first transaction 184, the first transaction 184 being of a read-type, the first transaction 184 being of a deterministic-type, the first transaction 184 being configured to identify at least one condition-satisfying TDL of the plurality of TDLs 320, the at least one condition-satisfying TDL having information identifying the at least one TDL of the plurality of TDLs and satisfying the condition. In some embodiments of the present technology, the condition-satisfying TDL is one of the at least one TDLs. In other embodiments of the present technology, to identify the at least one condition-satisfying TDL of the plurality of TDLs 320, the declarative to deterministic transaction processing system 400 is configured to access an inverted index 330 representative of (i) the information associated with the plurality of TDLs 320, and (ii) the respective ones of the plurality of TDLs 320. Additionally or alternatively, the condition-satisfying TDL may be a set of condition-satisfying TDLs in the plurality of TDLs 320. In some embodiments, the set of condition-satisfying TDLs is a set of immediately sequential condition-satisfying TDLs in the plurality of TDLs 320. In some embodiments of the present technology, the at least one condition-satisfying TDL comprises at least one of: (i) a target condition satisfying TDL for modifying information, and (ii) a target condition-satisfying TDL for modifying information for obtaining additional data for the last transaction 186.

The method 500 then advances to step 506.

STEP 506: acquire a lock value for the condition-satisfying transaction destination location, the lock value indicating of a current state of the condition-satisfying transaction destination location At step 506, the record locker 470 acquires a first lock value 426 for the condition-satisfying TDL in the plurality of TDLs 320, the lock value indicating of a current state of the at least one of the plurality of TDLs 320 satisfying the condition. In some embodiments of the present technology, to acquire the lock value, the record locker 470 is configured to acquire a spectrum lock value for the set of immediately sequential condition-satisfying TDLs in the plurality of TDLs 320, the spectrum lock value indicating (i) TDLs of the set of the immediately sequential condition-satisfying TDLs in the plurality of TDLs 320, and (ii) a current state of each one of the set of the immediately sequential condition-satisfying TDLs in the plurality of TDLs 320.

The method 500 then advances to step 508.

STEP 508: executing the first transaction

At step 508, the transaction processing sub-system 105 executes the first transaction 184.

The method 500 then advances to step 510.

STEP 510: processing the request and the at least one transaction destination location to generate a last transaction, the last transaction being of a modification-type, the last transaction being of the deterministic-type, the last transaction being configured to access information associated with the at least one transaction destination location based on the request At step 510, the declarative to deterministic transaction processing system 400 receives information from execution of the first transaction 184, and processes the request 180 to generate the last transaction 186, the last transaction 186 being of a modification-type, the last transaction 186 being of the deterministic-type, the last transaction 186 being configured to access information associated with the at least one of the plurality of TDLs 320 in the database sub-system 302. The modification-type is one of: (i) a write-type, the write-type being configured to modify information associated with the at least one TDL based on the request, and (ii) a verification-type.

The method 500 then advances to step 512.

STEP 512: determining if a current lock value associated with the condition-satisfying transaction destination location matches the lock value for the condition-satisfying transaction destination location, the current lock value representative of a then-state of the condition-satisfying transaction destination location At step 512, the record locker 470 determines if a second lock value 436 associated with the condition-satisfying transaction destination location 320 matches the first lock value 426 for the at least one of the plurality of TDLs 320 satisfying the condition, the second lock value 436 representative of a then-state of the at least one of the plurality of TDLs 320. In some embodiments of the present technology, the second lock value 436 representative of the then-state of the condition-satisfying TDL has changed based on another modification-type transaction having been executed on the condition-satisfying TDL after executing the first transaction 184. In other embodiments of the present technology, the second lock value 436 representative of the then-state of the condition-satisfying TDL has not changed based on another read-type transaction having been executed on the condition-satisfying TDL after executing the first transaction.

The method 500 then advances to step 514.

STEP 514: executing the last transaction only if the current lock value matches the lock value, the executing the last transaction comprises modifying the information associated with the at least one transaction destination location.

At step 514, the transaction processing sub-system 105 executes the last transaction 186 only if the second lock value 436 matches the first lock value 426, where the last transaction 186 comprises modifying information associated with the at least one of the plurality of TDLs 320. In some embodiments of the present technology, executing the last transaction 186 further comprises generating the response 181 for the request source 102 indicating a successful processing of the request 180. In other embodiments of the present technology, not executing the last transaction 186 further comprises generating the response 181 for the request source 102 indicating a failure of processing the request 180.

The method 500 may then end.

Figure 5:
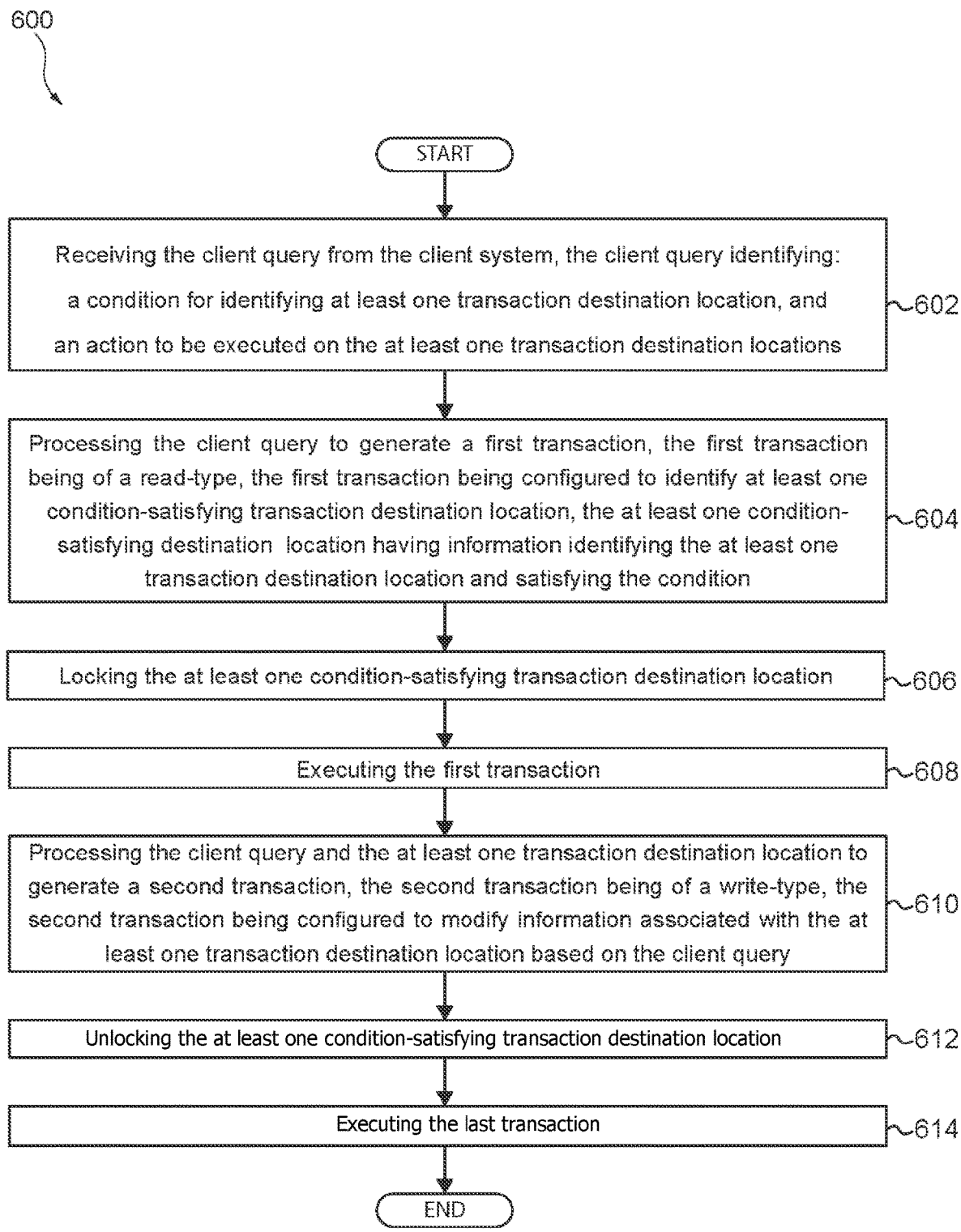
FIG. 5 depicts a flowchart of a method of processing a request in a distributed database using pessimistic type locking, the method executable within the computer-processing system of FIG. 1 in accordance with non-limiting embodiments of the present technology.

With reference to FIG. 5, there is depicted a flowchart of a method 600 of processing a request in a distributed database using pessimistic type locking according to non-limiting embodiments of the present technology.

The method 600 is executed by the distributed software system 300 within distributed processing system 100. The method 600 begins at step 602.

STEP 602: receiving the request from the request source, the request identifying:
(i) a condition for identifying at least one transaction destination location, and
(ii) an action to be executed on the at least one transaction destination locations At step 602, the declarative to deterministic transaction processing system 400 receives a request in the form of a request 180 from the request source 102, where the request 180 identifies a condition for identifying at least one of the plurality of TDLs 320 and an action to be executed on the at least one of the plurality of TDLs 320. In some embodiments of the present technology, the request validator 410 may parse the request 180 to check the validity and syntactical correctness of the request 180. The request 180 may be an SQL-type query destined from the request source 102 to the database sub-system 302.

The method 600 then advances to step 604.

STEP 604: processing the request to generate a first transaction, the first transaction being of a read-type, the first transaction being of a deterministic-type, the first transaction being configured to identify at least one condition-satisfying transaction destination location, the at least one condition-satisfying destination location having information identifying the at least one transaction destination location and satisfying the condition At step 604, the declarative to deterministic transaction processing system 400 processes the request 180 to generate a first transaction 184, the first transaction 184 being of a read-type, the first transaction 184 being of a deterministic-type, the first transaction 184 being configured to identify at least one of the plurality of TDLs 320 satisfying a condition, the at least one of the plurality of TDLs 320 having information identifying the at least one of the plurality of TDLs 320 and satisfying the condition. In some embodiments of the present technology, the condition-satisfying TDL is one of the at least one TDLs. In other embodiments of the present technology, to identify the at least one condition-satisfying TDL of the plurality of TDLs 320, the declarative to deterministic transaction processing system 400 is configured to access an inverted index 330 representative of (i) the information associated with the plurality of TDLs 320, and (ii) the respective ones of the plurality of TDLs 320. Additionally or alternatively, the condition-satisfying TDL may be a set of condition-satisfying TDLs in the plurality of TDLs 320. In some embodiments, the set of condition-satisfying TDLs is a set of immediately sequential condition-satisfying TDLs in the plurality of TDLs 320. In some embodiments of the present technology, the at least one condition-satisfying TDL comprises at least one of: (i) a target condition satisfying TDL for modifying information, and (ii) a target condition-satisfying TDL for modifying information for obtaining additional data for the last transaction 186.

The method 600 then advances to step 606.

STEP 606: locking the at least one condition-satisfying transaction destination location At step 606, the record locker 470 locks the at least one condition-satisfying TDL in the plurality of TDLs 320 such that it cannot be modified by other transactions in the distributed processing system 100.

The method 600 then advances to step 608.

STEP 608: executing the first transaction

At step 608, the transaction processing sub-system 105 executes the first transaction 184.

The method 600 then advances to step 610.

STEP 610: processing the request and the at least one transaction destination location to generate a last transaction, the last transaction being of a modification-type, the last transaction being of the deterministic-type, the last transaction being configured to access information associated with the at least one transaction destination location based on the request At step 610, the declarative to deterministic transaction processing system 400 receives information from execution of the first transaction 184, and processes the request 180 to generate the last transaction 186, the last transaction 186 being of a modification-type, the last transaction 186 being of the deterministic-type, the last transaction 186 being configured to access information associated with the at least one of the plurality of TDLs 320 in the database sub-system 302. The modification-type is one of: a write-type, and a verification-type. The write-type last transaction 186 is configured to access and modify information associated with the at least one of the plurality of TDLs 320 in the database sub-system 302. The verification-type last transaction 186 is configured to access information associated with the at least one of the plurality of TDLs 320 in the database sub-system 302

The method 600 then advances to step 612.

STEP 612: unlocking the at least one condition-satisfying transaction destination location At step 612, the record locker 470 removes the lock from the at least one condition-satisfying TDL of the plurality of TDLs 320.

The method 600 then advances to step 614.

STEP 614: executing the last transaction

At step 614, the transaction processing sub-system 105 executes the last transaction 186. In some embodiments of the present technology, executing the last transaction 186 further comprises generating the response 181 for the request source 102 indicating a successful processing of the request 180. In other embodiments of the present technology, not executing the last transaction 186 further comprises generating the response 181 for the request source 102 indicating a failure of processing the request 180.

The method 600 may then end.

It should be apparent to those skilled in the art that at least some embodiments of the present technology aim to expand a range of technical solutions for addressing a particular technical problem, namely processing a request of a declarative-type in a distributed system including a distributed database into a plurality of deterministic-type transactions to ensure transaction synchronicity in the distributed system by preventing simultaneous access and/or modification of information in the distributed database, which may allow saving computational resources, improving security, avoiding data loss and data collisions, as well as ensuring optimal functioning of the distributed system.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of processing a request, the request being of a declaratory-type and destined from a request source to a distributed database, the request source being connected to a distributed computer system, the distributed database being part of the distributed computer system, the distributed computer system having a query processing system, the distributed database having a plurality of transaction destination locations (TDLs), the method executable by the query processing system, the method comprising:

receiving, by the query processing system, the request from the request source, the request including: (i) a condition for identifying at least one TDL of the plurality of TDLs, and (ii) an action to be executed on the at least one TDL;

processing, by the query processing system, the request to generate a first transaction, the first transaction being of a read-type, the first transaction being of a deterministic-type, the first transaction being configured to:

identify at least one condition-satisfying TDL, the at least one condition-satisfying TDL having information identifying the at least one TDL and satisfying the condition, and acquire, by applying a hashing function to data corresponding to the at least one condition-satisfying TDL at a first time, a lock value for the at least one condition-satisfying TDL, the lock value being indicative of a current state of the at least one condition-satisfying TDL at the first time;

executing the first transaction;

processing, by the query processing system, the request and the at least one TDL to generate a last transaction, the last transaction being of a modification-type, the last transaction being of the deterministic-type, the last transaction being configured to:

access information associated with the at least one TDL based on the request;

before executing the last transaction, determining if a current lock value associated with the at least one condition-satisfying TDL matches the lock value for the at least one condition-satisfying TDL, wherein the current lock value is determined by applying the hashing function to the data corresponding to the condition-satisfying TDL at a second time, the second time being later than the first time, the current lock value representative of the then-state of the at least one condition-satisfying TDL at the second time; and executing the last transaction only if the current lock value matches the lock value, the executing the last transaction comprising modifying the information associated with the at least one TDL.

2. The method of claim 1, wherein the at least one condition-satisfying TDL is one of the at least one TDLs.

3. The method of claim 2, wherein to identify the at least one condition-satisfying TDL, the method further comprises:

accessing an inverted index representative of (i) the information associated with the plurality of TDLs, and (ii) the respective ones of the plurality of TDLs.

4. The method of claim 1, wherein the at least one condition-satisfying TDL is a set of condition-satisfying TDLs.

5. The method of claim 4, wherein the set of condition-satisfying TDLs is a set of immediately sequential condition-satisfying TDLs.

6. The method of claim 5, wherein to acquire the lock value, the method further comprises:

acquiring a spectrum lock value for the set of immediately sequential condition-satisfying TDLs, the spectrum lock value indicating:
(i) TDLs of the set of the immediately sequential condition-satisfying TDLs, and
(ii) a current state of each one of the set of the immediately sequential condition-satisfying TDLs.

7. The method of claim 1, wherein in response to the current lock value not matching the lock value, the method further comprises:

not executing the last transaction.

8. The method of claim 7, wherein the method further comprises:

transmitting, to the request source, a message indicating that the request has not been processed by the database.

9. The method of claim 8, wherein the message further enables the request source to re-issue the request.

10. The method of claim 1, wherein the determining if the current lock value associated with the condition-satisfying TDL matches the lock value for the condition-satisfying TDL renders a comparison result including one of:

the then-state of the condition-satisfying TDL has not changed, and the then-state of the condition-satisfying TDL has changed.

11. The method of claim 10, wherein the then-state of the condition-satisfying TDL has changed based on another modification-type transaction having been executed on the condition-satisfying TDL after executing the first transaction.

12. The method of claim 10, wherein the then-state of the condition-satisfying TDL has not changed based on another read-type transaction having been executed on the condition-satisfying TDL after executing the first transaction.

13. The method of claim 1, wherein the request is an SQL-type query destined from the request source to the distributed database.

14. The method of claim 1, wherein the executing the last transaction further comprises generating a message for the request source indicating a successful processing of the request by the distributed database.

15. The method of claim 1, wherein the modification-type is one of:
  (i) a write-type, the write-type being configured to modify information associated with the at least one TDL based on the request, and
  (ii) a verification-type.

16. The method of claim 1, wherein the at least one condition-satisfying TDL comprises at least one of:
  (i) a target condition-satisfying TDL for modifying information, and
  (ii) a target condition-satisfying TDL for modifying information for obtaining additional data for the last transaction.

17. The method of claim 1, further comprising, after executing the first transaction:
  receiving information identifying the at least one TDL and satisfying the condition based on the execution of the first transaction.

18. A method of processing a request, the request being of a declaratory-type and destined from a request source to a distributed database, the request source being connected to a distributed computer system, the distributed database being part of the distributed computer system, the distributed computer system having a query processing system, the distributed database having a plurality of transaction destination locations (TDLs), the method executable by the query processing system, the method comprising:
  receiving, by the query processing system, the request from the request source, the request identifying: (i) a condition for identifying at least one TDL, and (ii) an action to be executed on the at least one TDL;
  processing, by the query processing system, the request to generate a first transaction, the first transaction being of a read-type, the first transaction being of a deterministic-type, the first transaction being configured to:
    identify at least one condition-satisfying TDL, the at least one condition-satisfying TDL having information identifying the at least one TDL and satisfying the condition;
    acquire, by applying a hashing function to data corresponding to the at least one condition-satisfying TDL at a first time, a lock for the at least one condition-satisfying TDL;
  executing the first transaction;
  processing, by the query processing system, the request and the at least one TDL to generate a last transaction, the last transaction being of a modification-type, the last transaction being of the deterministic-type, the last transaction being configured to:
    access information associated with the at least one TDL based on the request;
    before executing the last transaction, checking a status of the lock associated with the at least one TDL, wherein checking the status of the lock comprises:
      determining a current lock value of the at least one condition-satisfying TDL by applying the hashing function to data corresponding to the at least one condition-satisfying TDL at a second time, the second time being later than the first time;
    only executing the last transaction if the current lock value is equal to a lock value of the lock.

19. The method of claim 18, wherein:
  the lock is of an optimistic type;
  the acquiring the lock comprises acquiring the lock value for the at least one condition-satisfying TDL, the lock value being indicative of a current state of the at least one condition-satisfying TDL at the first time.

20. The method of claim 18, wherein:
  the lock is of a pessimistic type;
  the acquiring the lock comprises applying the lock on the at least one condition-satisfying TDL such that the condition-satisfying TDL is inaccessible to other transactions in the distributed database; and
  after executing the last transaction, removing the lock.

21. A distributed software system for processing a request from a request source connected to the distributed software system, the distributed software system comprising:
  a distributed database having a plurality of a plurality of transaction destination locations (TDLs);
  a query processing system, the query processing system being configured to:
    receive the request from the request source, the request including: (i) a condition for identifying at least one TDL, and (ii) an action to be executed on the at least one TDL;
    process the request to generate a first transaction, the first transaction being of a read-type, the first transaction being of a deterministic-type, the first transaction being configured to:
      identify at least one condition-satisfying TDL, the at least one condition-satisfying TDL having information identifying the at least one TDL and satisfying the condition, and
      acquire, by applying a hashing function to data corresponding to the at least one condition-satisfying TDL at a first time, a lock value for the at least one condition-satisfying TDL, the lock value being indicative of a current state of the at least one condition-satisfying TDL;
    execute the first transaction;
    process the request and the at least one TDL to generate a last transaction, the last transaction being of a modification-type, the last transaction being of the deterministic-type, the last transaction being configured to:
      access information associated with the at least one TDL based on the request;
      before executing the last transaction, determine if a current lock value associated with the at least one condition-satisfying TDL matches the lock value for the at least one condition-satisfying TDL, wherein the current lock value is determined by applying the hashing function to the data corresponding to the condition-satisfying TDL at a second time, the second time being later than the first time, the current lock value representative of a then-state of the condition-satisfying TDL at the second time; and execute the last transaction only if the current lock value matches the lock value, the executing the last transaction comprising modifying the information associated with the at least one TDL.

22. The system of claim 21, wherein the at least one condition-satisfying TDL is one of the at least one TDLs.

23. The system of claim 22, wherein to identify the at least one condition-satisfying TDL, the query processing system is further configured to:
   access an inverted index representative of (i) the information associated with the plurality of TDLs, and (ii) the respective ones of the plurality of TDLs.

24. The system of claim 21, wherein the at least one condition-satisfying TDL is a set of condition-satisfying TDLs.

25. The system of claim 24, wherein the set of condition-satisfying TDLs is a set of immediately sequential condition-satisfying TDLs.

26. The system of claim 25, wherein to acquire the lock value, the query processing system is further configured to:
   acquire a spectrum lock value for the set of immediately sequential condition-satisfying TDLs, the spectrum lock value indicating:
      (i) TDLs of the set of the immediately sequential condition-satisfying TDLs, and
      (ii) a current state of each one of the set of the immediately sequential condition-satisfying TDLs.

27. The system of claim 21, wherein in response to the current lock value not matching the lock value, the query processing system is further configured to: not execute the last transaction.

28. The system of claim 27, wherein the query processing system is further configured to: transmit, to the request source, a message indicating that the request has not been processed by the database.

29. The system of claim 28, wherein the message further enables the request source to re-issue the request.

30. The system of claim 21, wherein the determining if the current lock value associated with the condition-satisfying TDL matches the lock value for the condition-satisfying TDL renders a comparison result including one of:
   the then-state of the at least one condition-satisfying TDL has not changed, and
   the then-state of the at least one condition-satisfying TDL has changed.

31. The system of claim 30, wherein the then-state of the at least one condition-satisfying TDL has changed based on another modification-type transaction having been executed on the at least one condition-satisfying TDL after executing the first transaction.

32. The system of claim 30, wherein the then-state of the at least one condition-satisfying TDL has not changed based on another read-type transaction having been executed on the at least one condition-satisfying TDL after executing the first transaction.

33. The system of claim 21, wherein the request is an SQL-type query destined from the request source to the distributed database.

34. The system of claim 21, wherein after executing the last transaction, the query processing system is further configured to: generate a message for the request source indicating a successful processing of the request by the distributed database.

35. The system of claim 21, wherein the modification-type is one of:
   (i) a write-type, the write-type being configured to modify information associated with the at least one TDL based on the request, and
   (ii) a verification-type.

36. The system of claim 21, wherein the at least one condition-satisfying TDL comprises at least one of:
   (i) a target condition-satisfying TDL for modifying information, and
   (ii) a target condition-satisfying TDL for modifying information for obtaining additional data for the last transaction.

37. The system of claim 21, wherein the query processing system is further configured to, after executing the first transaction:
   receive information identifying the at least one TDL and satisfying the condition based on the execution of the first transaction.

38. A distributed software system for processing a request from a request source connected to the distributed software system, the distributed software system comprising:
   a distributed database having a plurality of a plurality of transaction destination locations (TDLs); and
   a query processing system, the query processing system being configured to:
      receive the request from the request source, the request identifying: (i) a condition for identifying at least one TDL, and (ii) an action to be executed on the at least one TDL;
      process the request to generate a first transaction, the first transaction being of a read-type, the first transaction being configured to:
         identify at least one condition-satisfying TDL, the at least one condition-satisfying TDL having information identifying the at least one TDL and satisfying the condition;
         acquire, by applying a hashing function to data corresponding to the at least one condition-satisfying TDL at a first time, a lock for the at least one condition-satisfying TDL;
      execute the first transaction;
      process the request and the at least one TDL to generate a last transaction, the last transaction being of a modification-type, the last transaction being configured to:
         access information associated with the at least one TDL based on the request;
      before executing the last transaction, check a status of the lock associated with the at least one TDL, wherein checking the status of the lock comprises:
         determining a current lock value of the at least one condition-satisfying TDL by applying the hashing function to data corresponding to the at least one condition-satisfying TDL at a second time, the second time being later than the first time; and
      only execute the last transaction if the current lock value is equal to a lock value of the lock.

39. The system of claim 38, wherein:
   the lock is of an optimistic type;
   the acquiring the lock comprises acquiring the lock value for the at least one condition-satisfying TDL, the lock value being indicative of a current state of the at least one condition-satisfying TDL at the first time.

40. The system of claim 38, wherein:
the lock is of a pessimistic type;
the acquiring the lock comprises applying the lock on the at least one condition-satisfying TDL such that the condition-satisfying TDL is inaccessible to other transactions in the distributed database; and
after executing the last transaction, removing the lock.

* * * * *